US011382021B2

(12) United States Patent
Wang et al.

(10) Patent No.: US 11,382,021 B2
(45) Date of Patent: *Jul. 5, 2022

(54) METHODS FOR MAC FRAME EXTENSIBILITY AND FRAME SPECIFIC MAC HEADER DESIGN FOR WLAN SYSTEMS

(71) Applicant: InterDigital Patent Holdings, Inc., Wilmington, DE (US)

(72) Inventors: Lei Wang, San Diego, CA (US); Sudheer A. Grandhi, Pleasanton, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/020,447

(22) Filed: Sep. 14, 2020

(65) Prior Publication Data

US 2020/0413318 A1    Dec. 31, 2020

Related U.S. Application Data

(63) Continuation of application No. 14/018,056, filed on Sep. 4, 2013, now Pat. No. 10,779,212.
(Continued)

(51) Int. Cl.
| | | |
|---|---|---|
| H04W 4/00 | (2018.01) | |
| H04W 40/02 | (2009.01) | |
| H04W 12/06 | (2021.01) | |
| H04W 28/06 | (2009.01) | |
| H04W 84/12 | (2009.01) | |
| H04W 12/73 | (2021.01) | |

(52) U.S. Cl.
CPC .......... *H04W 40/02* (2013.01); *H04W 12/06* (2013.01); *H04W 12/73* (2021.01); *H04W 28/06* (2013.01); *H04W 84/12* (2013.01)

(58) Field of Classification Search
CPC ..... H04W 12/06; H04W 28/06; H04W 84/12; H04W 40/02
See application file for complete search history.

(56) References Cited

U.S. PATENT DOCUMENTS

| | | |
|---|---|---|
| 2003/0169769 A1 | 9/2003 | Ho et al. |
| 2009/0073905 A1 | 3/2009 | Gast |

(Continued)

FOREIGN PATENT DOCUMENTS

| | | |
|---|---|---|
| WO | 2007/026230 | 3/2007 |
| WO | 2013/052078 | 4/2013 |

OTHER PUBLICATIONS

Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad D9.0 (Jul. 2012).

(Continued)

*Primary Examiner* — Abdelillah Elmejjarmi
(74) *Attorney, Agent, or Firm* — Volpe Koenig

(57) ABSTRACT

A method and apparatus are provided for processing a Class-3 MAC Data frame. The Class-3 MAC Data frame may include a Type field, a Subtype field, and a Class-3 MAC Data frame-specific MAC subheader that includes a basic service set identifier (BSSID) field, an association identifier (AID) field, and a direction indicator. A station (STA) may determine the intended recipient of the Class-3 MAC Data frame based on the BSSID field, the AID field, and the direction indicator.

20 Claims, 16 Drawing Sheets

Related U.S. Application Data

(60) Provisional application No. 61/697,126, filed on Sep. 5, 2012.

(56) References Cited

U.S. PATENT DOCUMENTS

| | | | |
|---|---|---|---|
| 2010/0165906 | A1 | 7/2010 | Chu et al. |
| 2010/0226315 | A1 | 9/2010 | Das et al. |
| 2011/0141892 | A1 | 6/2011 | Gong et al. |
| 2012/0079271 | A1 | 3/2012 | Cordeiro et al. |
| 2013/0128809 | A1 | 5/2013 | Wentink et al. |
| 2014/0010223 | A1 | 1/2014 | Wang et al. |
| 2014/0036775 | A1 | 2/2014 | Asterjadhi et al. |

OTHER PUBLICATIONS

Draft Standard for Information Technology—Telecommunications and information exchange between systems—Local and metropolitan area networks—Specific requirements; Part 11: Wireless LAN Medium Access Control (MAC) and Physical Layer (PHY) specifications, Amendment 4: Enhancements for Very High Throughput for Operation in Bands below 6 GHz, IEEE P802.11ac/D3.0 (Jun. 2012).

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: TV White Spaces Operation, IEEE P802.11af/D2.0 (Jul. 2012).

Emmelmann, "TGai Requirements Document," IEEE P802.11 Wireless LANs, IEEE 802.11-11/0745r5 (May 2011).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

Park, "Proposed Specification Framework for TGah," IEEE P802.11 Wireless LANs, IEEE 802.11-11/1137r10 (Jul. 2012).

Siep et al., "Specification Framework for TGai," IEEE P802.11 Wireless LANs, IEEE 802.11-12/0151r7 (Jan. 2011).

Siep et al., "Specification Framework for TGai," IEEE P802.11 Wireless LANs, IEEE 802.11-12/0151r12 (Jul. 2012).

METHODS FOR MAC FRAME EXTENSIBILITY AND FRAME SPECIFIC MAC HEADER DESIGN FOR WLAN SYSTEMS

CROSS REFERENCE TO RELATED APPLICATIONS

This application is a continuation of U.S. patent application Ser. No. 14/018,056 filed Sep. 4, 2013, which issued as U.S. Pat. No. 10,779,212 on Sep. 15, 2020, which claims the benefit of U.S. Provisional Application No. 61/697,126 filed Sep. 5, 2012, the contents of which are hereby incorporated by reference herein.

BACKGROUND

An IEEE 802.11-based Wireless Local Area Network (WLAN) system provides packet based data communications among Stations (STAs) over a wireless medium. At the Medium Access Control (MAC) sublayer, the MAC Service Data Units (MSDUs) are received from or delivered to the upper layer; and MAC Protocol Data Units (MPDUs) are formed and transported between MAC peer STAs. MPDUs are also called MAC frames in the IEEE 802.11 standard.

A MAC frame type is identified by a combination of a 2-bit Type field and a 4-byte Subtype field in the Frame Control field of the MAC header. There are three frame types defined in the IEEE 802.11-2012 specification, including the Management frame, the Control frame, and the Data frame. For each frame type, multiple Subtypes have been defined, as shown in Table 8-1 in the IEEE 802.11-2012 specification. In the IEEE 802.11ad draft standard, another frame type is defined, called an Extension frame. Two Subtype values have been defined for the Extension frame type, a directional multi-gigabit (DMG) Beacon subtype and a short beacon frame subtype.

A MAC frame generally consists of three basic components: A MAC header, which comprises a frame control field, a duration field, an address field, optional sequence control information, optional quality of service (QoS) Control information (QoS data frames only), and optional HT Control fields (+HTC frames only); a variable-length frame body, which contains information specific to the frame type and subtype; and a frame check sequence (FCS), which contains an IEEE 32-bit cyclic redundancy check (CRC).

SUMMARY

A method and apparatus are provided for processing a Class-3 MAC Data frame. The Class-3 MAC Data frame may include a Type field, a Subtype field, and a Class-3 MAC Data frame-specific MAC subheader that includes a basic service set identifier (BSSID) field, an association identifier (AID) field, and a direction indicator. A station (STA) may determine the intended recipient of the Class-3 MAC Data frame based on the BSSID field, the AID field, and the direction indicator.

BRIEF DESCRIPTION OF THE DRAWINGS

A more detailed understanding may be had from the following description, given by way of example in conjunction with the accompanying drawings wherein.

DETAILED DESCRIPTION

Figure 1A:
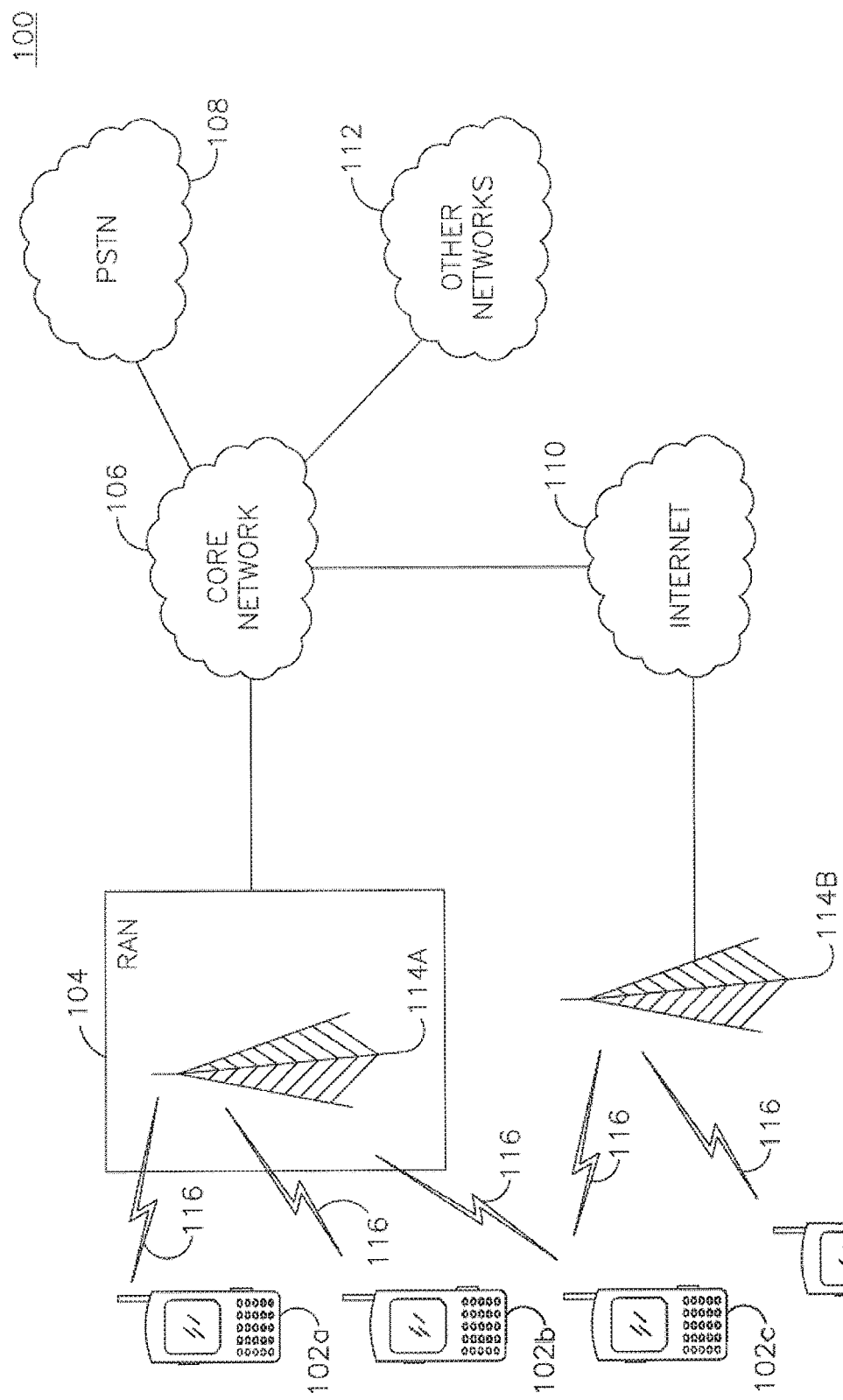
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a station (STA), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, a station (STA), and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
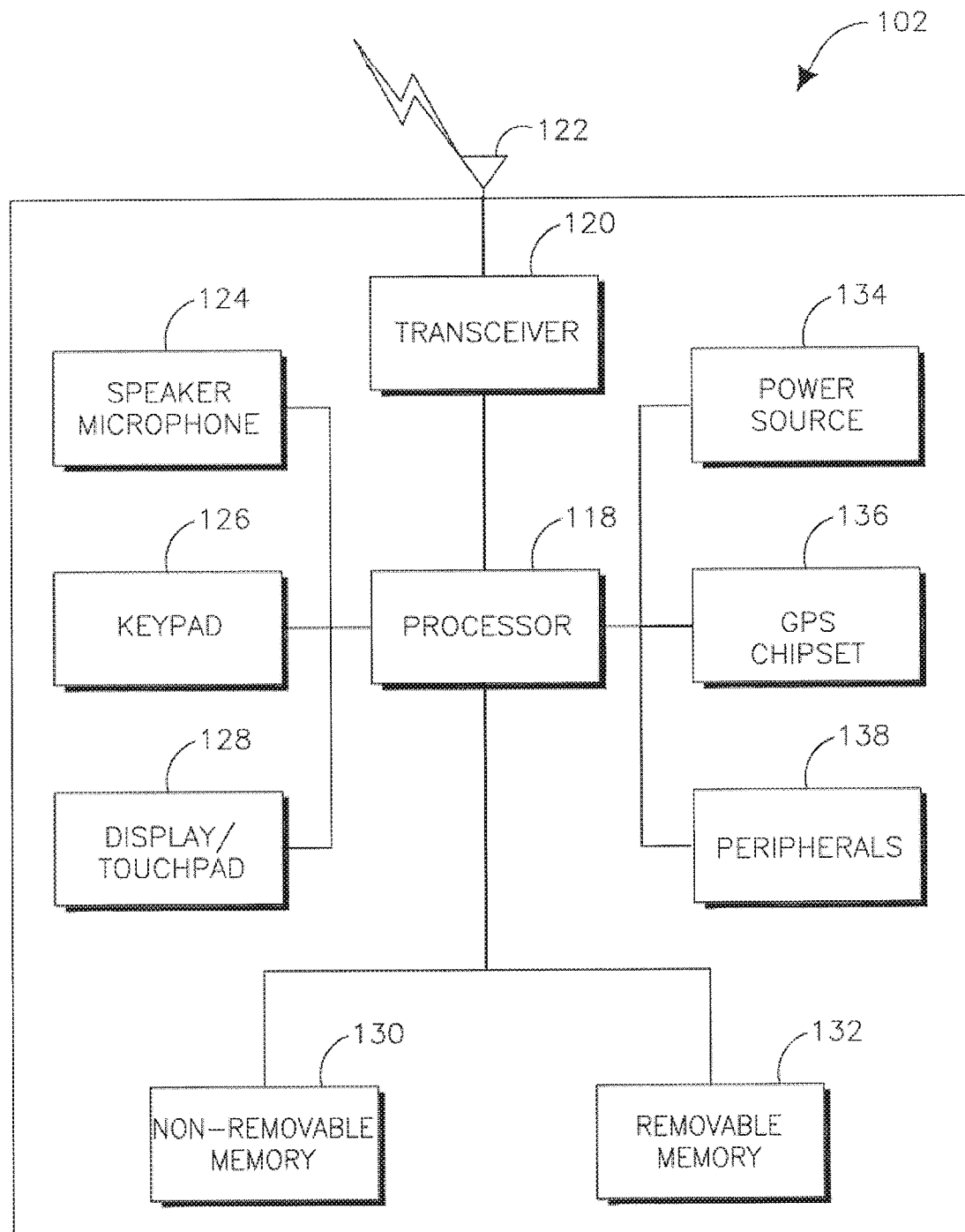
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
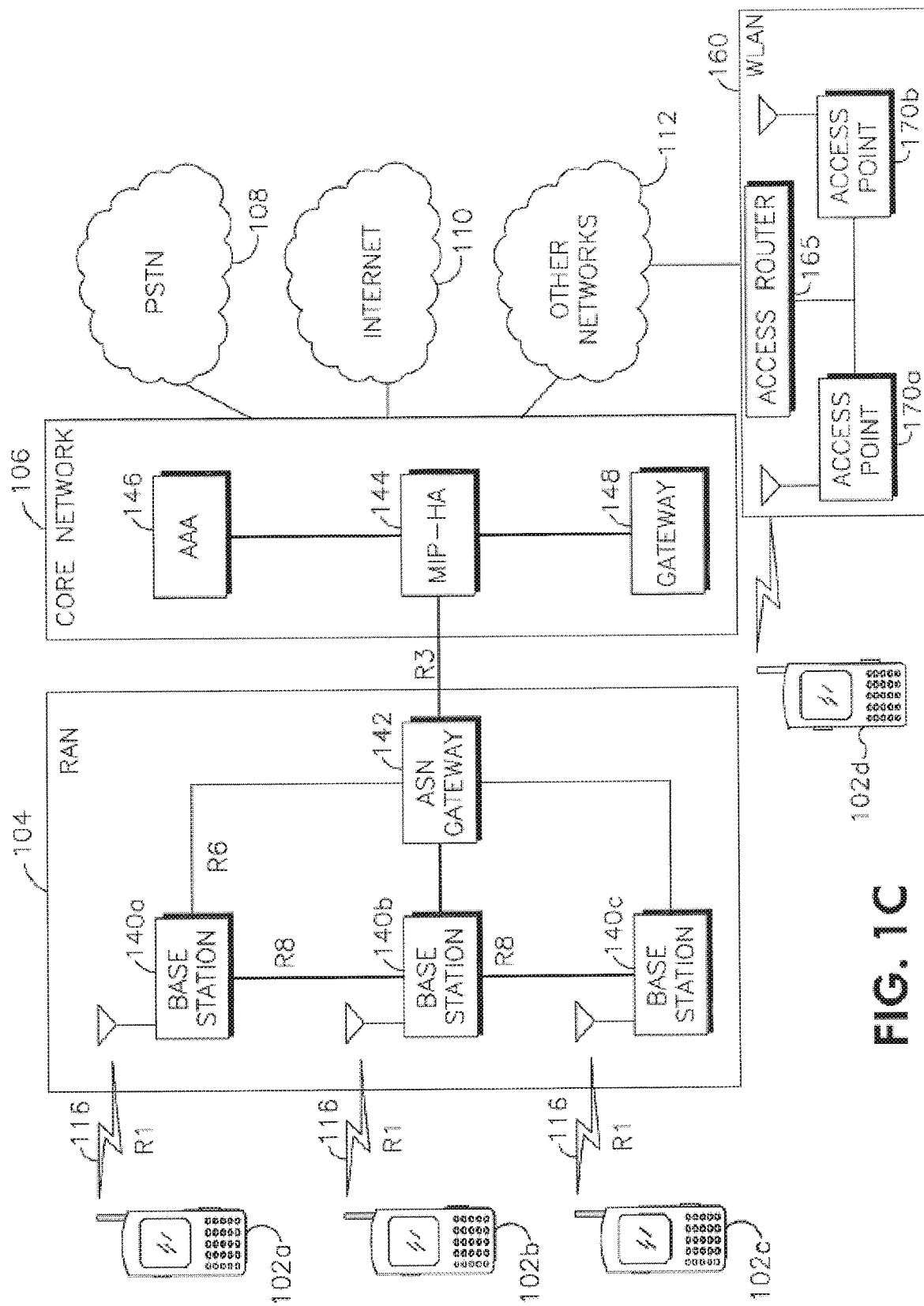
FIG. 1C is a system diagram of an example radio access network and an example core network that may be used within the communications system illustrated in FIG. 1A.

As shown in FIG. 1C, the RAN 104 may include base stations 140*a*, 140*b*, 140*c*, and an ASN gateway 142, though it will be appreciated that the RAN 104 may include any number of base stations and ASN gateways while remaining consistent with an embodiment. The base stations 140*a*, 140*b*, 140*c* may each be associated with a particular cell (not shown) in the RAN 104 and may each include one or more transceivers for communicating with the WTRUs 102*a*, 102*b*, 102*c* over the air interface 116. In one embodiment, the base stations 140*a*, 140*b*, 140*c* may implement MIMO technology. Thus, the base station 140*a*, for example, may use multiple antennas to transmit wireless signals to, and receive wireless signals from, the WTRU 102*a*. The base stations 140*a*, 140*b*, 140*c* may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102*a*, 102*b*, 102*c* and the RAN 104 may be defined as an R1 reference point that implements the IEEE 802.16 specification. In addition, each of the WTRUs 102*a*, 102*b*, 102*c* may establish a logical interface (not shown) with the core network 106. The logical interface between the WTRUs 102*a*, 102*b*, 102*c* and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 215 may be defined as an R6 reference point. The R6 reference point may include protocols for facilitating mobility management based on mobility events associated with each of the WTRUs 102a, 102b, 100c.

As shown in FIG. 1C, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 1C, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

Other networks 112 may further be connected to an IEEE 802.11 based wireless local area network (WLAN) 160. The WLAN 160 shown here may be designed to implement the inventive features of the present application. The WLAN 160 may include an access router 165. The access router may contain gateway functionality. The access router 165 may be in communication with a plurality of access points (APs) 170a, 170b. The APs 170a, 170b may be configured to perform the methods described below. The communication between access router 165 and APs 170a, 170b may be via wired Ethernet (IEEE 802.3 standards), or any type of wireless communication protocol. AP 170a is in wireless communication over an air interface with WTRU 102d. WTRU 102 may be an IEEE 802.11 STA, and may also be configured to perform the methods described herein.

Herein, the terminology "STA" includes but is not limited to a wireless transmit/receive unit (WTRU), a user equipment (UE), a mobile station, a fixed or mobile subscriber unit, an AP, a pager, a cellular telephone, a personal digital assistant (PDA), a computer, a mobile Internet device (MID) or any other type of user device capable of operating in a wireless environment. When referred to herein, the terminology "AP" includes but is not limited to a base station, a Node-B, a site controller, or any other type of interfacing device capable of operating in a wireless environment.

The present application addresses a number of limitations with the current MAC frame design. In the IEEE 802.11-2012 standard, the maximum number of identifiable MAC frames is limited by the Type field and Subtype field. With a 2-bit Type field and a 4-bit Subtype field, up to 2²*2⁴=4*16=64 MAC frames may be defined. The current and proposed usage of the available code points of the combined Type field and Subtype field is as follows: IEEE 802.11-2012: 38 code points used; IEEE 802.11ad: 2 additional code points used; IEEE 802.11ac: 2 additional code points used; IEEE 802.11ah: 1 additional code point proposed thus far; IEEE 802.11ai: 1 additional code point proposed thus far. In summary, there are 44 code points that have been used or proposed in the combination of Type field and Subtype field. With the continued development of the IEEE 802.11 standard, the available code points of Type and Subtype fields for new MAC frames are quickly running out.

In addition, there are different demands for adding new frames for different frame types. For example, there is only one available (currently reserved) code point in the Subtype field for Data frame with Type=0b10, and there are only two available (currently reserved) code points in the Subtype field for Management frames with Type=0b00.

It should also be pointed out that there currently is one mechanism for defining new MAC management Action frames, which is to define a new Category value in the Action frame and/or define a new Public Action Field value for a Public action frame. However, this mechanism only applies to the specific case of Action frames or Public Action frames, and it adds an extra 1 or 2 bytes to the MAC framing overhead. Therefore, the development of efficient mechanisms to support MAC framing extensibility in IEEE 802.11-based WLAN systems is needed.

Figure 2:
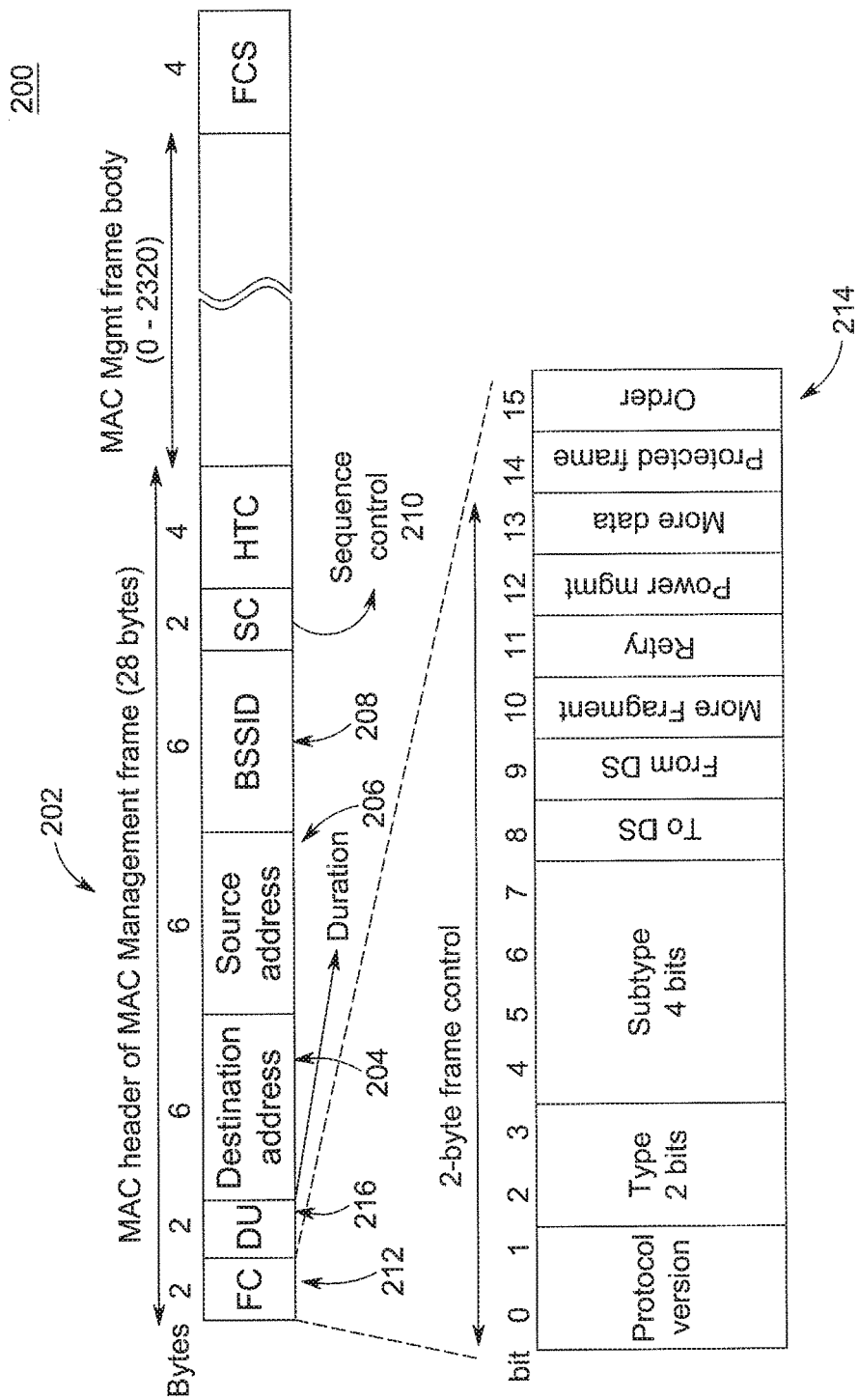
FIG. 2 shows the IEEE 802.11 MAC Management frame format.

In the IEEE 802.11-2012 standard, the MAC header is designed to be as generic as possible for all MAC frames. This is particularly true for different frames within a single type of MAC frame. For example, for MAC Management frames (i.e., Type=0b00), the MAC header format is as shown in FIG. 2. The MAC Management frame format shown in FIG. 2 applies to all of the MAC management frames 200. However, not all of the information fields and subfields in the MAC header 202 may be needed for all of the MAC management frames 200, thus resulting in extra MAC framing overhead for some MAC frames. For example, for the Beacon frame (Type=0b00 and Subtype=0b1000), the 6-byte destination address 204 may not be needed, as the Beacon frame is a broadcast frame. In addition, the Beacon frame is transmitted by an AP STA, so the Source Address 206 and Basic Service Set Identification (BSSID) 208 are the same, i.e., the AP's 6-byte MAC address. Moreover, the 2-byte Sequence Control (SC) field 210 may not be needed by the Beacon frame. Therefore, 6+6+2=14 bytes in the MAC management frame header 202 may not actually be needed for the Beacon frame, which is 50% of the current 28-byte header. In addition, in the 2nd byte of the Frame Control (FC) field 212, i.e., bit 8 to 15, only the 1-bit Order indicator 214 applies to the Beacon frame, while the other 7 bits do not apply.

In order to keep backward compatibility of 802.11-based WLAN systems, it may not be practical to change the MAC format/MAC header design of the existing MAC frames. However, when addressing MAC frame extensibility and the introduction of new MAC frames, it may be possible to enhance encoding efficiency by minimizing MAC framing overhead. This may be particularly important for WLAN systems with low data rates, e.g., IEEE 802.11ah systems with small channel bandwidths. It may also be important for new MAC frames that are designed to be transmitted frequently, e.g., the Fast Initial Link Setup (FILS) Discovery frame in IEEE 802.11ai systems.

It should be also pointed out that a similar issue exists for the Information Element (IE) encoding format, where the available code points of the 1-byte Element ID (EID) field are quickly running out, thus resulting in a serious concern for future evolutions of WirelessLAN systems. Note that the 1-byte EID field gives a total 256 code points, i.e., it may be used to identify a maximum of 256 IEs. In the IEE 802.11 standards up to and including IEEE 802.11ad, about 164 IEs have been defined. There are also multiple IEEE 802.11 development projects that are currently in progress, e.g., IEEE 802.11ah, IEEE 802.11ai, etc. Each of these in-progress IEEE 802.11 projects is expected to introduce new IEs, for example, about 25 new IEs are introduced in the current IEEE 802.11ah specification Draft 0.1, dated May 2013, and about 14 new IEs are introduced in the current 802.11ai specification Draft 1.0, dated August 2013. This means approximately 203 IEs have been defined, leaving only 53 EID code points remaining. Also, note that the IE format is important to IEEE 802.11 MAC management frames, as it is the fundamental mechanism for encoding variable-size information items and optional information items. It is important to address the extensibility issue of the IEs.

The following four solutions address the above identified issues of MAC frame extensibility, MAC header inefficiency, and IE extensibility. First, a multi-level extension scheme for MAC frame designs supports the introduction of new MAC frames as IEEE 802.11-based WLAN technology evolves. Second, an inventive MAC header structure that consists of two basic subheaders, a Generic MAC Subheader (GMSH) and a Frame-Specific MAC Subheader, minimizes the MAC framing overhead by allowing customized MAC headers. Third, a new addressing scheme in a Class-3 MAC Data frame uses a combination of a BSSID, an association identification (AID), and a Direction indicator to uniquely identify the Source STA and the Destination STA. Fourth, a multi-level extension scheme for IEs provides a backwards compatible solution to the IE format extensibility issue. Further details of these embodiments are provided herein.

The introduction of a multi-level Extension scheme in a MAC frame design would provide flexible extensibility for the MAC frame design and would allow legacy STAs to properly identify and skip over the extension frames. As used herein, the term "legacy STA" refers to a STA that is compliant with the WLAN specification before the extension frames are introduced. The basic embodiments of the multi-level extension scheme first include assigning a combination or combinations of Type value and Subtype value to identify the Extension frame or frames, where the Type value and the Subtype value are chosen from the available values, i.e., those values currently reserved, based on current IEEE 802.11 MAC frames. Another level of "type" information is then introduced within the Extension frame, called Sub2type, to identify each individual frame under the same Type/Subtype combination. These frames are called Extension-2 frames, and may be identified by a triplet: (Type, Subtype, Sub2type). The invention may further comprise recursively assigning one or multiple Extension-2 frame identifier triplets for a next level of Extension frames, called Extension-3 frames. Another level of "type" information may be introduced to identify each Extension-3 frame, called Sub3type. An Extension-3 frame identifier may then be a quadruplet: (Type, Subtype, Sub2type, Sub3type). This step may be applied again, as many times as needed, each time introducing another level of Extension frames.

Based on the above-described basic embodiments, multiple variants of the multi-level extension MAC frame design may be introduced to the IEEE 802.11-based WLAN systems. The following provides three examples. The first employs a General Extension-2 frame using an Extension Frame Type and an Extension-2 Frame Subtype. The second embodiment employs a Frame Type Specific Extension-2 frame with an Extension Frame Type and an Extension-2 Management Frame Subtype, an Extension-2 Control Frame Subtype, or an Extension-2 Data Frame Subtype. The third embodiment employs a Frame Type Specific Extension-2 frame with a Management Frame Type, a Control Frame Type, or a Data Frame Type. Further details are given below.

In a first embodiment of the present invention, one Subtype value under the Extension Frame Type may be reserved as a general Extension-2 Frame Subtype, which provides further extensibility for MAC frame design. For example, if the Subtype value indicates an Extension-2 Frame, then an additional field with "type" information will be present in the MAC header. A General Extension-2 frame may be any type of MAC frame, e.g., a Management frame, a Control frame, or a Data frame. Table 1 below shows an example of Subtype value assignments for Extension frames, where the Extension-2 Frame Subtype is assigned for the General Extension-2 frame. The Type and Subtype values shown below are exemplary and non-limiting.

TABLE 1

| | General Extension-2 Frame | | |
|---|---|---|---|
| Type Value (b3 b2) | Type Description | Subtype Value (b7 b6 b5 b4) | Subtype Description |
| 11 | Extension Frame | 0000 | DMG Beacon (defined in IEEE 802.11adError! Reference source not found.) |
| 11 | Extension Frame | 0001 | Short Beacon (defined in IEEE 802.11ah) |
| 11 | Extension Frame | 0010 | FILS Discovery Frame (IEEE 802.11ai proposal) |
| 11 | Extension Frame | 0011 to 1110 | Reserved for future Extension frames |
| 11 | Extension Frame | 1111 | Extension-2 Frame |

The Extension-2 frame may use another level of "type" information inside the Subtype to extend the domain of MAC frame identifications. Such a new level of "Type" may be called Minitype, Subsubtype, Sub2type, etc. Sub2type will be used in the rest of this document to denote the new level of type information introduced in the Extension-2 frame.

Figure 3:
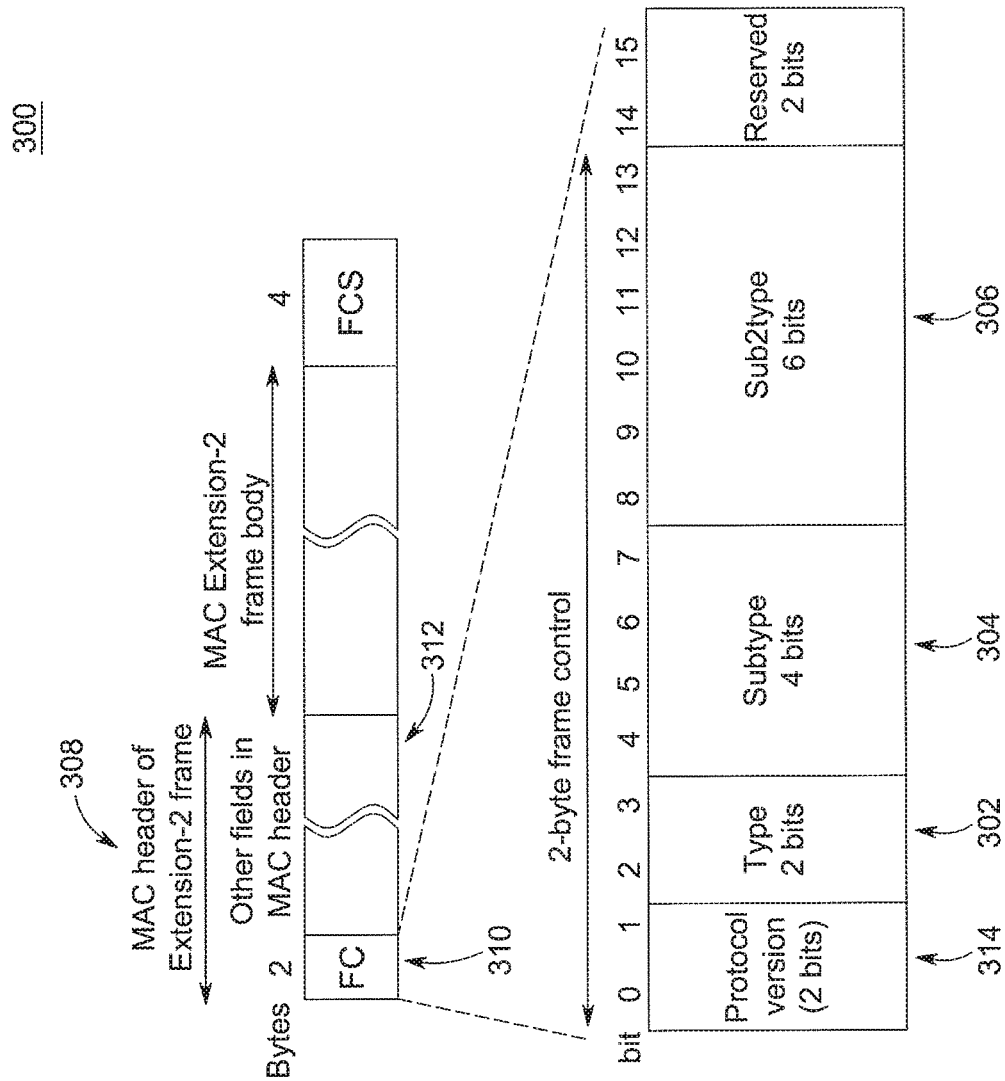
FIG. 3 illustrates an example IEEE 802.11 MAC Extension-2 frame format.

FIG. 3 shows an example of the basic format of an Extension-2 frame 300. A value in the Type field 302 indicates a general Extension frame, a value in the Subtype field indicates a general Extension-2 frame, and a 6-bit Sub2type field 306 is used to identify each individual Extension-2 frame. Some alternative Extension-2 frame basic formats may be designed using different Subtype values chosen from the currently available set and/or having different sizes, i.e., numbers of bits, for the Sub2type field 306. An Extension-2 frame may be identified by a triplet, (Type, Subtype, Sub2type). Using the example values shown in Table 1, the Extension-2 frame identifier may be a triplet, (0b11, 0b1111, Sub2type), and the Sub2type field 306 may be a 6-bit field, allowing for a total of 64 Extension-2 frames to be identified. The exact coding indicated above is purely exemplary and is provided for ease of description, and is not meant to limit this embodiment in any way.

In order to keep the Extension-2 frame further extendible, one Sub2type value may be reserved to identify a next level of extension, i.e., Extension-3 frames, where another level of "type" information is introduced, called Sub3type, to identify each individual Extension-3 frame. Therefore, an Extension-3 frame may be identified by a quadruplet, (Type, Subtype, Sub2type, Sub3type). For example, if Sub2type=0b111111 is assigned to indicate Extension-3 frames, then an Extension-3 frame identifier is a quadruplet, (0b11, 0b1111, 0b111111, Sub3type). The size of Sub3type may be chosen based on the demand and tendency of the system and technology developments, e.g., 4 bits, 6 bits, 8 bits, etc. The above proposed extension scheme may be recursively applied, in order to provide scalable and flexible MAC frame designs. Again, the embodiment is not limited to the coding indicated above, which is purely exemplary.

As shown in FIG. 3, the Extension-2 frame MAC header 308 may consist of two basic components, the Frame Control (FC) field 310 and the other MAC header fields 312. The first byte of the FC field 310 of the Extension-2 frame 300 may have exactly the same format as the existing MAC frames in WLAN systems, i.e., a 2-bit Protocol Version field 314, a 2-bit Type field 302, and a 4-bit Subtype field 304. This facilitates Extension-2 frame processing. The part of the header comprising the other MAC header fields 312 may be designed to be generic to all Extension-2 frames or specific to each individual Extension-2 frame. More detail is provided below regarding the processing of the Extension-2 frame 300, and the design of the part of the header comprising the other MAC header fields 312.

In another embodiment, an indication that the MAC frame is an extension frame may be included in the PLCP header or PHY preamble. Such an indication may be included using any of the following: one or more bits in the PHY SIG fields, special code/pattern in the training fields of the PLCP header, or special modulation in the PHY SIG fields. This additional PHY layer indication may allow for some additional power saving for STAs that do not support the extension frames, since such STAs may stop decoding the packet after receiving the PLCP header if there is a positive indication that the MAC part of the frame is an extension frame. The STA may continue to decode the packet after the PLCP header if there is a negative indication (i.e., the MAC part of the frame is not an extension frame). For STAs that do not support extension frames, i.e., legacy STAs, a PHY layer indication may speed up the decoding of the MAC packet due to the early indication in the PLCP that the MAC part of the frame is an extension frame.

Similar to any other MAC frame introduced after the first IEEE 802.11 standard was published, the Extension-2 frame may be used in a WLAN system where some STAs may not be able to process the Extension-2 frame, e.g., legacy STAs. Therefore, one fundamental design requirement for the Extension-2 frame is that its introduction not disrupt the operation of the legacy STAs. This further requires the Extension-2 frame to be introduced in such a way that legacy STAs may properly identify it and proceed to the next frame. To achieve this, the following information items may be provided to STAs: the identification of the Extension-2 frame, the length of the Extension-2 frame, and the location of the Extension-2 frame. The identification of the Extension-2 frame is the combination of Type value and Subtype value, given in the first byte of the FC field 310, which is how STAs currently identify existing MAC frames. Therefore, the Extension-2 frame may be identified by both legacy STAs and Extension-2 frame capable STAs.

The length information may be provided in the same way as in existing MAC frames, i.e., the length field in the PLCP header, and/or the length field in the MPDU delimiter in the Aggregate MPDU (A-MPDU) format. Note that this is independent of the introduction of the Extension-2 frame and the design of Extension-2 frame. Similarly, the location information may be provided in the same way as existing MAC frames, i.e., in a PPDU or in an A-MPDU.

Figure 4:
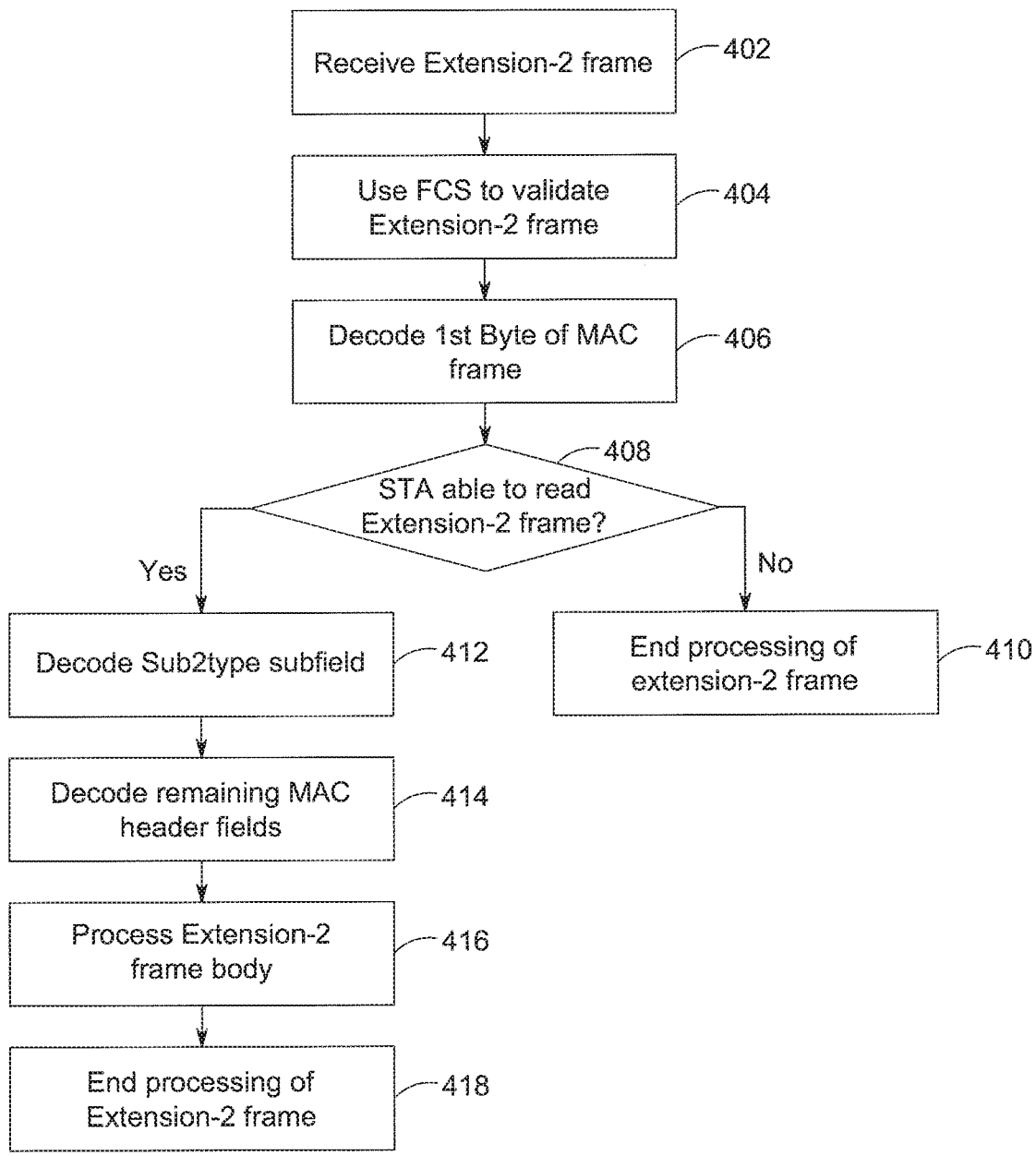
FIG. 4 shows a flow diagram for a possible Extension-2 frame processing procedure.

The Extension-2 frame may be used in WLAN systems that allow coexistence of legacy STAs and Extension-2 frame capable STAs, with the following general processing procedure 400, depicted in FIG. 4. Upon receipt of the Extension-2 frame (step 402), the STA may validate the received frame using a frame checking sequence (FCS) (step 404). The STA may then decode the first byte of the MAC frame (step 406). If the STA is a legacy STA, it will find that the received frame is an unknown frame by the Type value and the Subtype value (step 408). It may then end the processing of the received frame (step 410), and may choose to sleep for the rest of received packet as indicated by the length.

Alternatively, if the STA is an Extension-2 frame capable STA, it may decode the Sub2type subfield to identify the specific Extension-2 frame (step 412). The STA may then decode the remaining MAC header fields (step 414) based on the entire Extension-2 frame identification information triplet, (Type, Subtype, Sub2type). It may process the Extension-2 frame body based on the decoded MAC header information (step 416), and finally it may complete the processing of the received frame (step 418).

Note that the frame validation with FCS (step 404) may be the same as that specified in the current IEEE 802.11 standard, i.e., it may be independent of the introduction of the Extension-2 frame. The apparatus depicted in FIGS. 1B and 1C, and specifically the STA 102d in FIG. 1C, may be configured to process the Extension-2 frame according to the steps described above and illustrated in FIG. 4.

As an alternative design to the General Extension-2 frame described above, a Frame Type Specific Extension-2 frame design may be used that defines different Extension-2 frames for different MAC frame types, including MAC Management frames, MAC Control frames, and MAC Data frames. In this embodiment, under the general Extension Frame Type, Subtype values may be reserved to indicate an Extension-2 Management frame, and an Extension-2 Control frame, or an Extension-2 Data frame. Table 2 below shows an example of Subtype assignments for the Frame Type Specific Extension-2 frames. The Type and Subtype values shown below are again merely exemplary and are non-limiting.

TABLE 2

Frame Type Specific Extension-2 Frame using Extension Frame Type

| Type Value (b3 b2) | Type Description | SubType Value (b7 b6 b5 b4) | Subtype Description |
|---|---|---|---|
| 11 | Extension Frame | 0000 | DMG Beacon (defined in IEEE 802.11ad) |
| 11 | Extension Frame | 0001 | Short Beacon (defined in IEEE 802.11ah) |
| 11 | Extension Frame | 0010 | FILS Discovery Frame (IEEE 802.11ai proposal) |
| 11 | Extension Frame | 0011 to 1100 | Reserved for future Extension frames |
| 11 | Extension Frame | 1101 | Extension-2 Management Frame |
| 11 | Extension Frame | 1110 | Extension-2 Control Frame |
| 11 | Extension Frame | 1111 | Extension-2 Data Frame |

Figure 5:
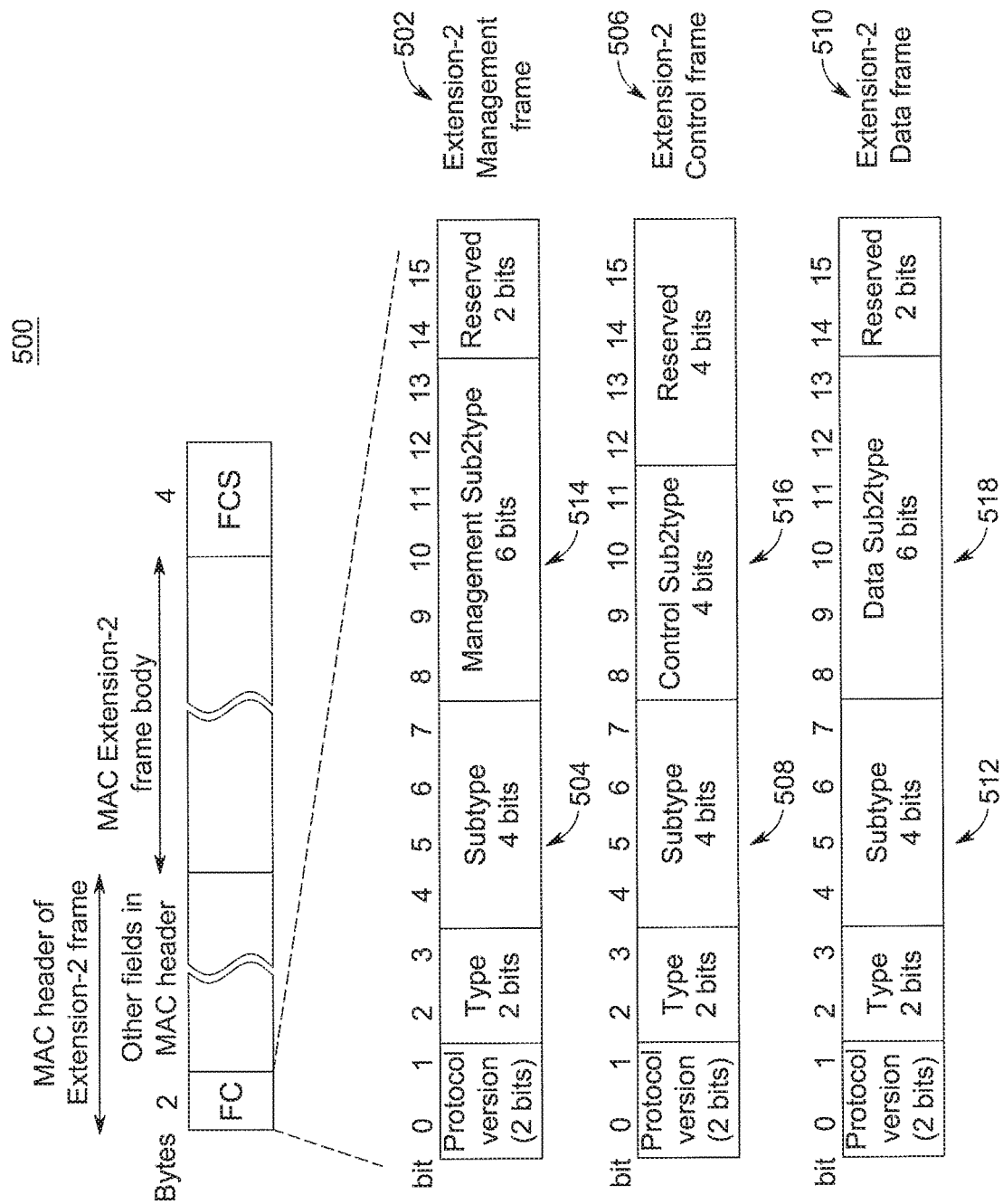
FIG. 5 depicts example IEEE 802.11 MAC Frame Type Specific Extension-2 frame formats using a general Extension-2 Frame Type.

FIG. 5 shows an example of the basic formats of the Frame Type Specific Extension-2 frames 500, including a Frame Control field for an Extension-2 Management frame 502, an Extension-2 Control frame 506, and an Extension-2 Data frame 510. Note that each Extension-2 frame may have a value in its Subtype field 504, 508, 512 that indicates an Extension-2 Management frame, and an Extension-2 Control frame, or an Extension-2 Data frame. The values in the Subtype fields 504, 508, 512 indicate the presence of an addition "type" field in each frame, a Management Sub2type field 514, a Control Sub2type field 516, or a Data Sub2type field 518. For illustration purpose, FIG. 5 shows that the Control Sub2type field 516 of the Control frame 506 is a 4-bit subfield, which is different from the Management Sub2type field 514 of the Extension-2 Management frame 502 and the Data Sub2type field 518 of the Extension-2 Data frame 510. Alternative numbers of bits may be chosen for the Sub2type fields of the Control, Management, and Data frames. In addition, this embodiment is not limited to the values shown in Table 2. The exact coding indicated above is purely exemplary and is provided for ease of description, and is not meant to limit the embodiment in any way.

Similar to the General Extension-2 frame described above, the Frame Type Specific Extension-2 frames 500 may use the multi-level extension scheme to provide further extensions when needed. In addition, with exactly the same first byte of the FC field as is in existing MAC frames, the Frame Type Specific Extension-2 frames may be properly received and processed by Extension-2 frame capable STAs and legacy STAs according to the method shown in FIG. 4.

As an alternative embodiment, the currently reserved (available) Subtype values in the Management Frame Type, Control Frame Type, and Data Frame Type may be used to define the Frame Type Specific Extension-2 frames. Table 3 below shows an example of Type and Subtype assignments for the Frame Type Specific Extension-2 frames, where the selected Type/Subtype values are currently reserved in the IEEE 802.11 standard. The Type and Subtype values shown below are again merely exemplary and are non-limiting.

TABLE 3

Frame Type Specific Extension-2 Frame using Management Frame Type, Control Frame Type, and Data Frame Type

| Type Value (b3 b2) | Type Description | SubType Value (b7 b6 b5 b4) | Subtype Description |
|---|---|---|---|
| 00 | Management Frame | 1111 | Extension-2 Management Frame |
| 01 | Control Frame | 0101 | Extension-2 Control Frame |
| 10 | Data Frame | 1101 | Extension-2 Data Frame |

Figure 6:
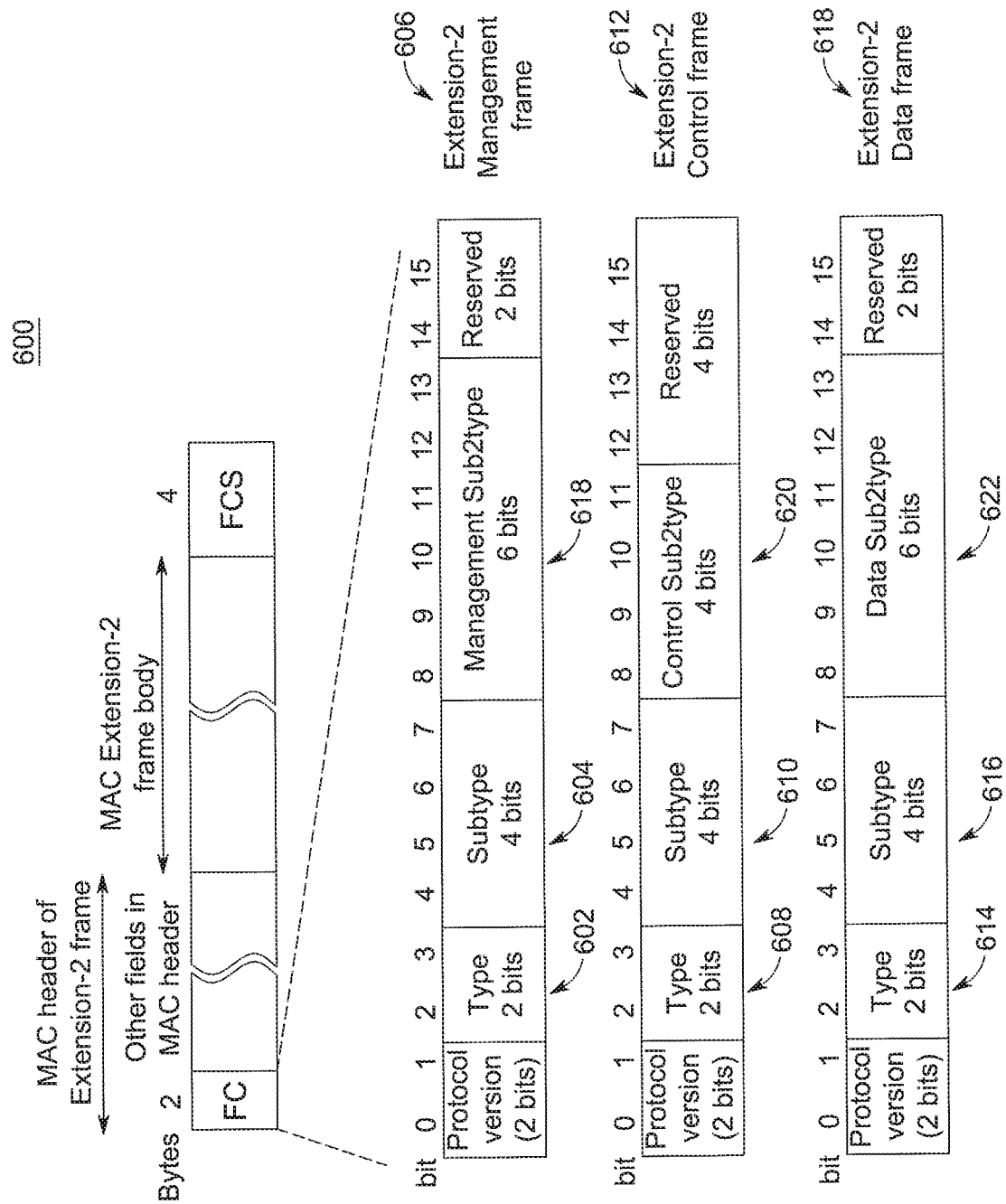
FIG. 6 shows example IEEE 802.11 MAC Frame Type Specific Extension-2 frame formats using a Management Frame Type, a Control Frame Type, and a Data Frame Type.

Similar to the embodiments described above, another level of "type" information, Sub2type, is introduced in each of the Frame Type Specific Extension-2 frames, in this case using Type values to indicate a Management Frame Type, Control Frame Type, and Data Frame Type, and Subtype values to indicate that the frame is an Extension-2 frame. FIG. 6 shows an example of the basic formats of the Frame Type Specific Extension-2 frames 600. For the Extension-2 Management frame 606, a value in the Type field 602 may indicate a Management frame, and a value in the Subtype field 604 may indicate an Extension-2 Management frame. Similarly, for the Extension-2 Control frame 612, a value in the Type field 608 may indicate a Control frame, and a value in the Subtype field 610 may indicate an Extension-2 Control frame. Finally, for the Extension-2 Data frame 618, a value in the Type field 614 may indicate a Data frame, and a value in the Subtype field 616 may indicate an Extension-2 Data frame. The Sub2type field is defined for each Extension-2 frame type, as shown in FIG. 6, where the Control Sub2type field 620 is of 4 bits, different from the Management Sub2type field 618 and Data Sub2type field 622. Once again, the number of bits of the Sub2type fields 618, 620, 622 is purely exemplary and non-limiting.

Similar to the General Extension-2 frame and Frame Type Specific Extension-2 frames using a general Extension Frame Type described above, the Frame Type Specific Extension-2 frames using a Management Frame Type, Control Frame Type, and Data Frame Type may be properly received and processed by Extension-2 frame capable STAs and legacy STAs according to the method shown in FIG. 4. While the values shown in Table 3 may be used in this embodiment, the embodiment is not limited to these values. The exact coding indicated above is purely exemplary and is provided for ease of description, and is not meant to limit the embodiment in any way.

Focus is now turned to MAC framing inefficiency. An inventive MAC header for IEEE 802.11-based WLAN systems may consist of two subheaders: a Generic MAC Subheader (GMSH) and a Frame-Specific MAC Subheader (FS-MSH). The GMSH may have the same format in all MAC frames, including legacy MAC frames and MAC frames with the inventive MAC header design. The GMSH may contain the information required to distinguish which MAC header format is used, e.g., a legacy MAC header format or the inventive MAC header format. The FS-MSH may have content and a format designed for a specific MAC frame or a set of MAC frames. The FS-MSH may contain all of the information that is needed to correctly decode and process the MAC frame.

Figure 7:
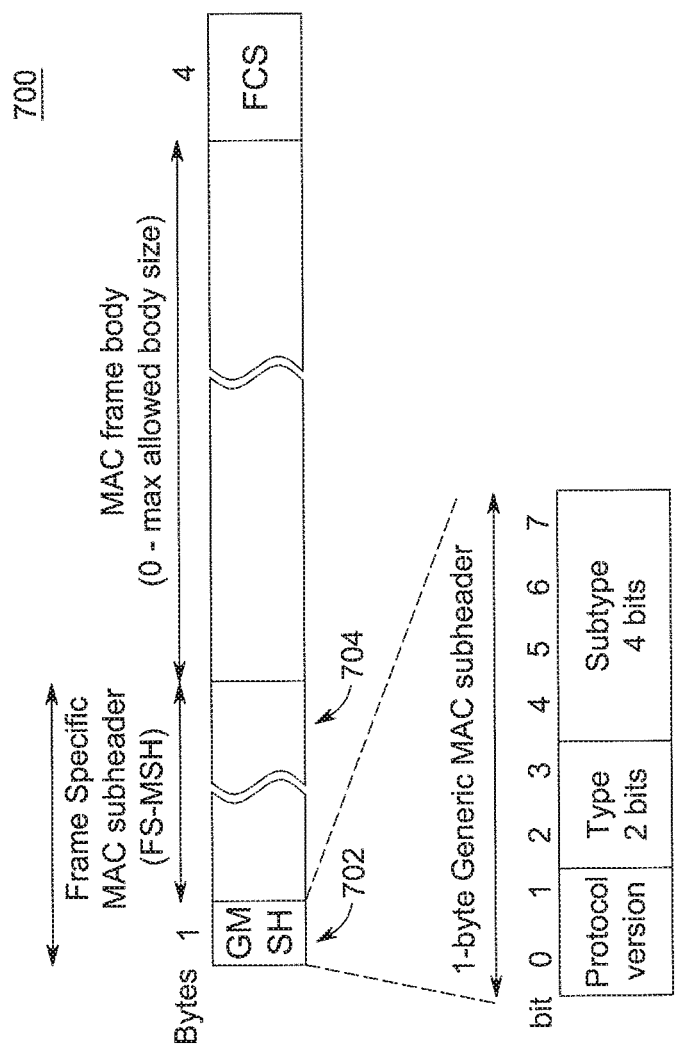
FIG. 7 shows a possible basic MAC frame format with an inventive MAC header.

FIG. 7 shows an example of the format of a basic MAC frame 700 with the inventive MAC header design, where the GMSH 702 is 1 byte and has the same format as the first byte of the FC field of the existing MAC frame header as specified in the IEEE 802.11 standard. The FS-MSH 704 follows the GMSH 702, and is described in more detail below.

Note that a MAC frame with the inventive MAC header design may be identified by STAs through specific values of Type and Subtype in the first byte of a MAC frame, for example, the Extension MAC frames as described above. If a STA is capable of processing the MAC frame format of this embodiment, it may use the information given in the FS-MSH to decode and process the rest of the MAC frame. Otherwise, the STA may use the length information given in the Physical Layer Convergence Procedure (PLCP) header and/or given in the MPDU delimiter in Aggregate MPDU (A-MPDU) format to bypass the remainder of the current frame and proceed to the next frame. Therefore, the introduction of the MAC format of this embodiment will not disrupt the operation of legacy STAs that are not capable of processing the MAC frame with the inventive format. This allows the MAC frame format of this embodiment to coexist with the legacy MAC frame format in WLAN systems, where the legacy STAs can operate normally, and new STAs (i.e., capable of processing the inventive MAC frame format) can benefit from the encoding efficiency introduced by the inventive MAC frame format.

Figure 8:
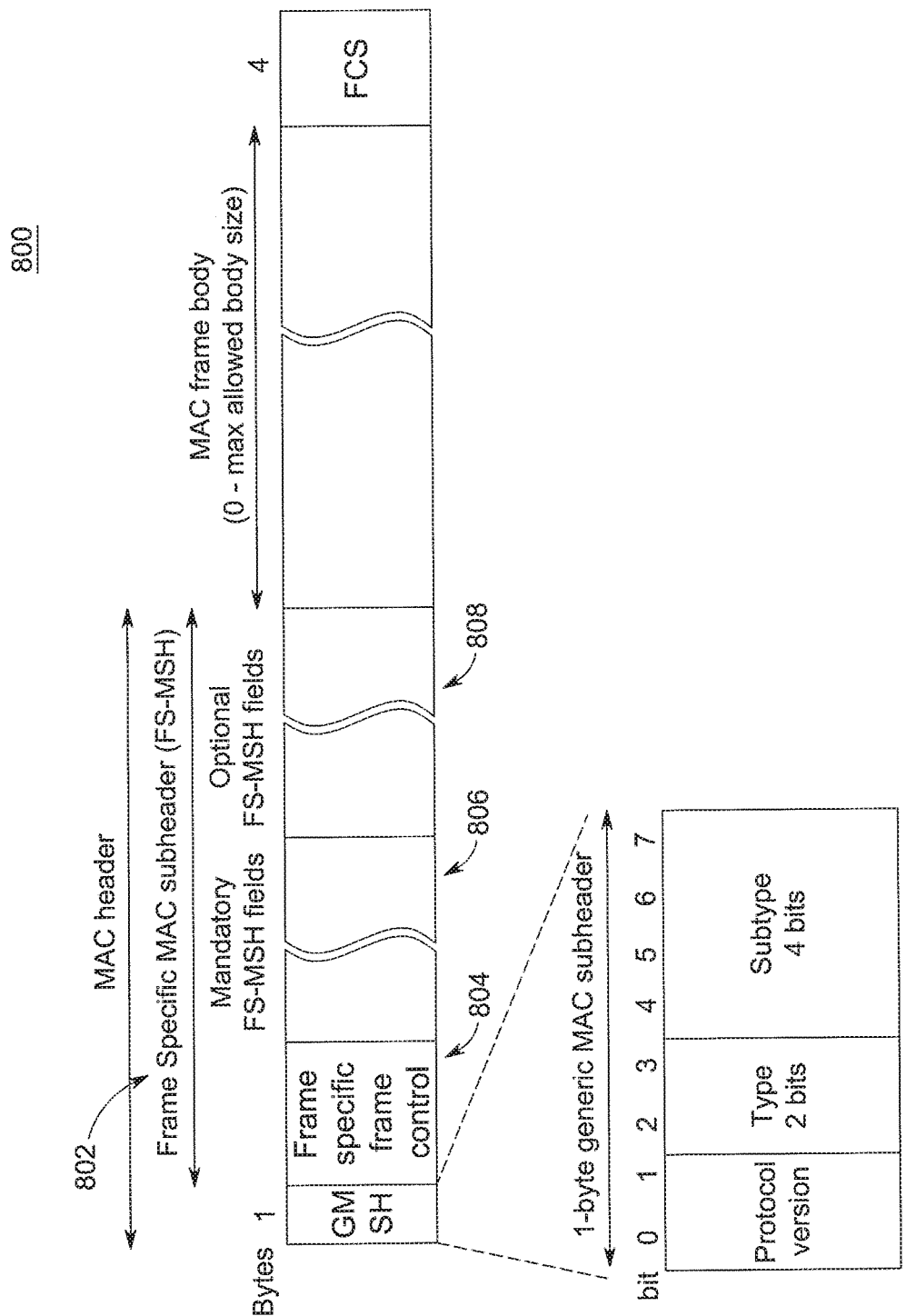
FIG. 8 depicts a possible basic structure of a Frame-Specific MAC subheader.

FIG. 8 illustrates the basic structure of the FS-MSH 802 in a basic MAC frame 800. The FS-MSH 802 is designed to contain the minimum necessary information for decoding and processing a specific MAC frame or a specific set of MAC frames, so that MAC framing overhead may be minimized. It generally consists of three components: a Frame-Specific Frame Control field (FS-FC) 804 that contains the control information regarding the FS-MSH structure and the MAC frame structure, e.g., indicating the presence of optional FS-MSH fields in the FS-MSH; one or more Mandatory FS-MSH fields 806 that must appear in the MAC frame or the set of MAC frames; and one or more Optional FS-MSH fields 808 that may appear in the MAC frame or the set of MAC frames. Further details of the FS-MFS design are described below through examples.

Figure 9:
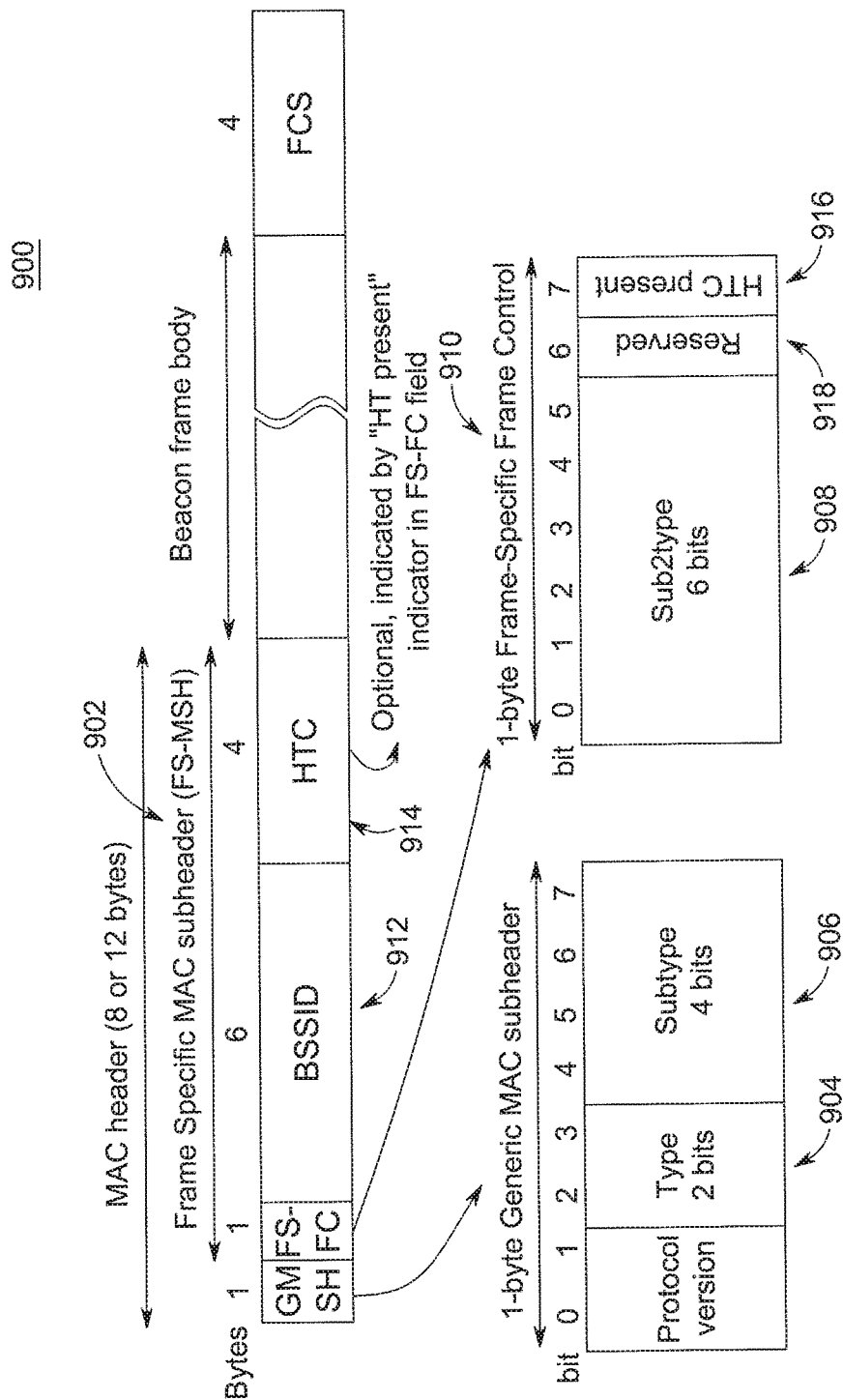
FIG. 9 illustrates an Infrastructure BSS Beacon frame with an inventive MAC header design.

In an infrastructure BSS, a Beacon frame is periodically broadcasted by the AP STA. The IEEE 802.11 Beacon frame has the MAC management frame format shown in FIG. 2, where some MAC header fields are actually not needed for the Beacon frame in an infrastructure BSS as pointed out previously herein. FIG. 9 shows an example of an Infrastructure BSS Beacon frame 900 with the inventive MAC header design. The Infrastructure BSS Beacon frame 900 may be encoded as an Extension-2 frame with a value in the Type field 904 indicating a general Extension frame, a value in the Subtype field 906 indicating an Extension-2 frame, and a value in the Sub2type field 908 indicating an Infrastructure BSS Beacon frame. However, other Type, Subtype, and Sub2type values may also be used. In FIG. 9, the FS-MSH 902 for the Infrastructure BSS Beacon frame consists of a 1-byte Frame-Specific Frame Control (FS-FC) field 910, a 6-byte BSSID field 912, and a 4-byte optional High Throughput Control (HTC) field 914. Note that the HTC field 914 may include the HT version/form or the very high throughput (VHT) version/form.

The 1-byte FS-FC field 910 may contain a 6-bit Sub2type field 908 to identify the MAC frame. It may also contain a 1-bit indicator "HTC Present" 916 to indicate if the 4-byte HTC field 914 is present in the FS-MSH 902. The HTC Present indicator 916 may be set to one (1) when transmitted with a value of HT_GF or HT_MF for the FORMAT parameter of the TXVECTOR to indicate that the frame contains an HT Control field. FIG. 9 also shows a bit 918 in the FS-FC field 910 that may be reserved. The 6-byte BSSID field 912 may be the AP STA's address. It may also be the source address of the frame if it is transmitted by the AP STA of the infrastructure BSS.

Comparing FIG. 9 to FIG. 2, the MAC framing overhead for the Infrastructure BSS Beacon frame may be significantly reduced by the MAC header design of this embodiment, i.e., from 28 or 32 bytes to 12 or 16 bytes depending on HTC presence, due to the removal of several MAC header fields. For example, referring to FIG. 2, the two address fields 204 and 206, the Duration/ID field 216, and the Sequence Control field 210 may be removed. The MAC framing overhead reduction is particularly important for broadcast frames, as broadcast frames may be transmitted using the most robust modulation/coding schemes, and therefore are the most expensive in terms of wireless medium occupancy. The MAC framing overhead reduction is also important for periodic or repeated frames, and for WLAN systems with small channel bandwidth, e.g., IEEE 802.11ah-based systems. In these systems the channel bandwidth may be as small as 1 MHz or 2 MHz, and the data rate may be as low as 100 Kbps. In such systems, a MAC frame may occupy up to 20 times more wireless medium than in 20 MHz WLAN systems, which makes MAC framing overhead reduction very important.

The Infrastructure BSS Beacon frame applies to all of the above-mentioned areas. Based on the IEEE 802.11ah Specification Framework Document (SFD), the regular beacon frame still needs to be transmitted, as the IEEE 802.1111ah short beacon may not contain all of the information contained in the regular beacon. Considering no legacy STAs in IEEE 802.11ah-based systems, the Infrastructure BSS Beacon frame 900 with the MAC header design shown in FIG. 9 may be used in 802.11ah-based WLAN systems as an alternative to the existing Beacon frame. These systems would benefit from the 16-byte MAC framing overhead reduction, which translates to 1.28 ms wireless medium occupancy reduction at 100 Kbps. In addition to the MAC framing overhead reduction, the Infrastructure BSS Beacon frame 900 with the MAC header design of this embodiment also allows for optimizations and even re-designs in the Beacon frame body, as it is a new MAC frame that does not need to follow the same frame body design as the existing Beacon frame.

Figure 10:
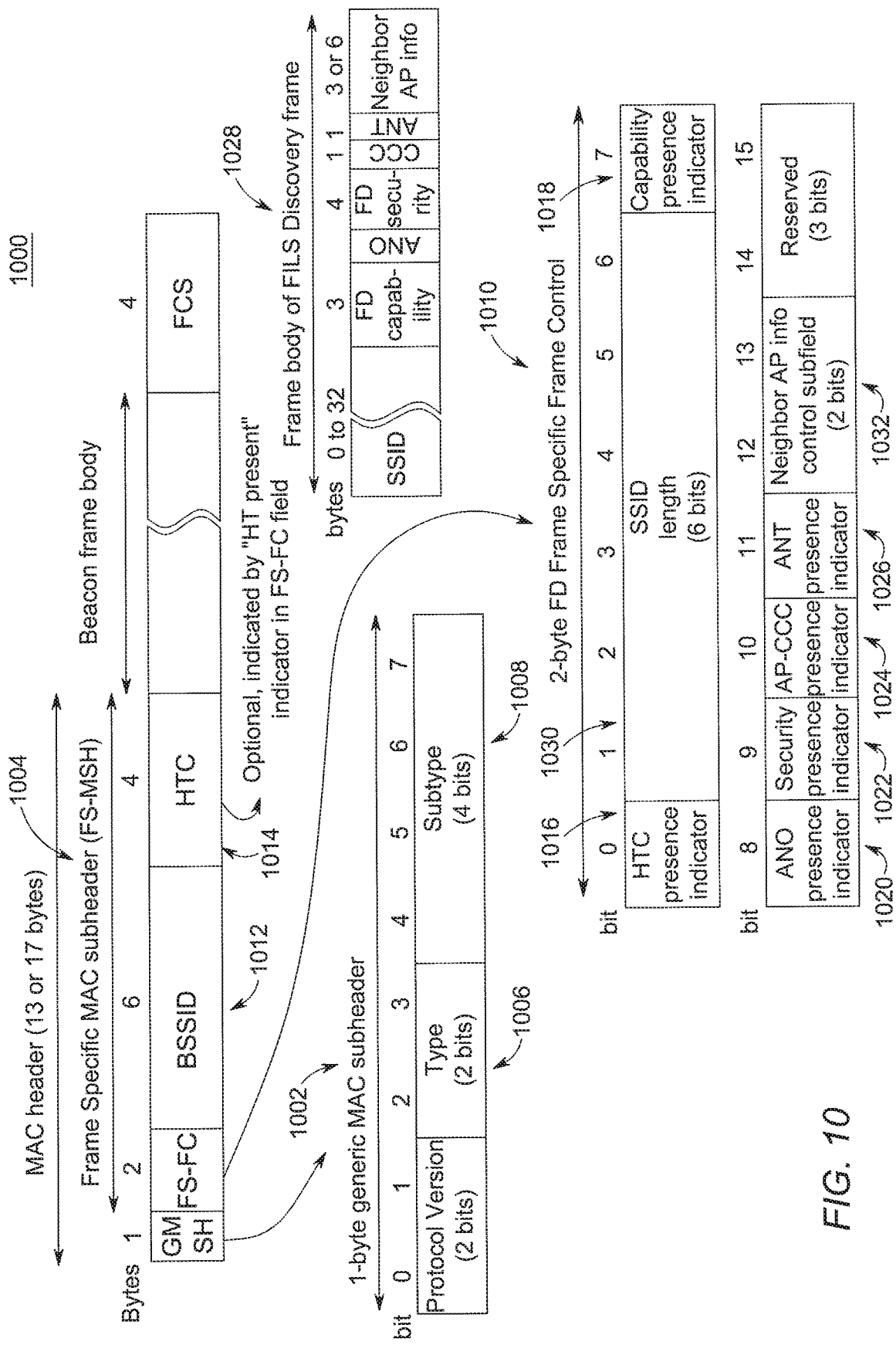
FIG. 10 shows a Fast Initial Link Setup (FILS) Discovery Frame with an inventive MAC header design.

Another type of frame that may benefit from the inventive MAC header design is the Fast Initial Link Setup (FILS) Discovery frame. The FILS Discovery (FD) frame has been proposed to IEEE 802.11ai, and is designed to provide necessary information transmitted from an AP to STAs for fast initial link setup. It may be transmitted more frequently than the regular Beacon transmissions, so it may be particularly important to minimize its MAC framing overhead. As shown in FIG. 10, the FD frame 1000 may be designed as an Extension frame with a value in the Type field 1006 indicating an Extension frame, and a value in the Subtype field 1008 indicating an FD frame, though other Type and Subtype values may also be used. The FD frame design in FIG. 10 gives another example of the MAC header design with a Generic MAC Subheader (GMSH) 1002 and a Frame-Specific MAC Subheader (FS-MSH) 1004. The FS-MSH 1004 of the FD frame 1000 may consist of a 2-byte FD Frame-Specific Frame Control (FS-FC) field 1010, a 6-byte BSSID field 1012, and a 4-byte optional HTC field 1014, where the BSSID and the HTC are the same as in the Infrastructure BSS Beacon frame in FIG. 9. The 2-byte FD FS-FC field 1010 may consist of multiple presence indicators, including an HTC presence indicator 1016, a Capability presence indicator 1018, an Access Network Options (ANO) presence indicator 1020, a Security presence indicator 1022, an AP Configuration Change Count (AP-CCC) presence indicator 1024, and an AP's Next Target Beacon Transmission Time (TBTT) (ANT) presence indicator 1026, to indicate whether the frame contains corresponding information items in the FS-MSH 1004 and in the frame body 1028. The 2-byte FD FS-FC field 1010 may also comprise control subfields to provide the necessary information for decoding and processing the frame, e.g., the SSID Length subfield 1030 and the Neighbor AP Information Control subfield 1032.

Compared to encoding the FD frame in a Management format as shown in FIG. 2, the FD frame 1000 with the inventive MAC header design has a significant MAC framing overhead reduction, i.e., from 28 or 32 bytes to 13 or 17 bytes depending on the HTC presence. In addition, the introduction of the FD FS-FC field 1010 significantly improves the FD frame body encoding efficiency, compared to using the Information Element format for variable size information items and optional information items, which is the basic method used in the current IEEE 802.11 standard. When using Information Elements, each variable size item or optional item in the FD frame body requires an additional 2 bytes for the Element ID field and the Element Length field. In the FD frame example shown in FIG. 10, there are seven content items in the FD frame body that are either variable-size or optional. Therefore, another 14 bytes are needed when using the Information Element format instead of using the FD FS-FC field 1010.

Figure 11:
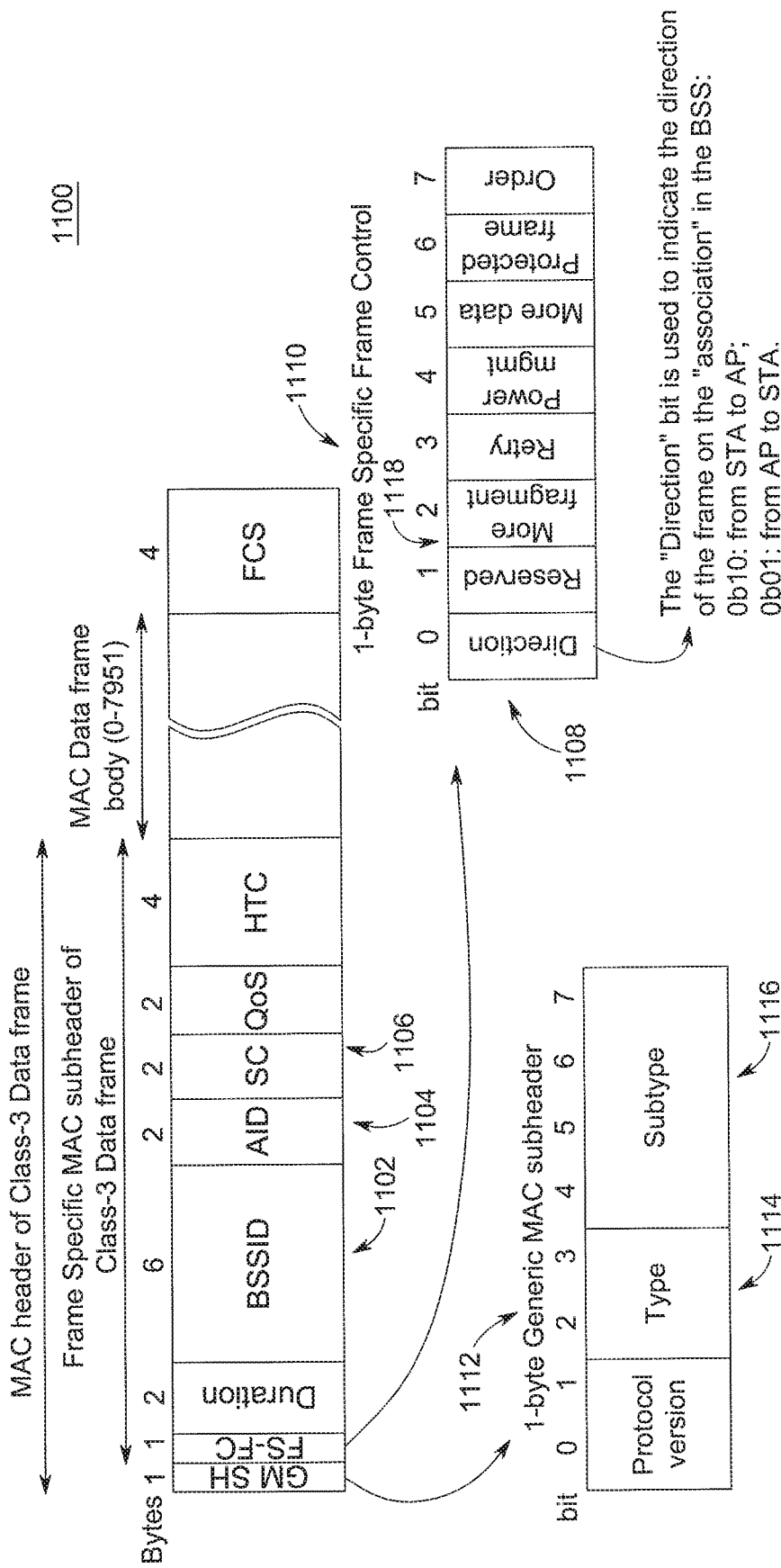
FIG. 11 illustrates a Class-3 MAC Data frame with an inventive MAC header design.

In addition to the Beacon frame and the FILS Discovery Frame, the Class-3 MAC Data frame may also benefit from the inventive MAC header design. The Class-3 MAC Data frame is defined in the IEEE 802.11-2012 standard as a data frame that can only be transported among STAs in State-3 or State-4, i.e., after being authenticated and associated in an infrastructure BSS or in a mesh BSS (MBSS). In an infrastructure BSS, the association means that the AP STA and the associated non-AP STA have established a known relationship, from which they have certain knowledge of each other, e.g., MAC address, capabilities, etc., and an Association Identifier (AID) is assigned by the AP STA to identify the associated non-AP STA. Such knowledge may be used to optimize the MAC frame design. FIG. 11 shows an example of a Class-3 Data frame format with the MAC header design of this embodiment. Note that, in the example shown in FIG. 11, the Class-3 Data frame 1100 with the inventive MAC header is defined as an Extension frame with values in the Type field 1114 and Subtype field 1116 of the Generic MAC subheader 1112 that indicate a Class-3 Data frame. For example, a value in the Type field 1114 may indicate a general Extension frame and a value in the Subtype field 1116 may indicate a Class-3 Data frame. Alternatively, other available Type and Subtype values for the Extension frame may be used. In addition, the Extension-2 frame format may be used for the Class-3 MAC Data frame.

For an infrastructure BSS, the current IEEE 802.11-2012 MAC data frame 1100 comprises three 6-byte address fields and two 1-bit indicators, To DS and From DS. Referring to FIG. 11, the three address fields may be replaced by one 6-byte address field of BSSID 1102 and one 2-byte ID field of Association ID (AID) 1104. Second, the two 1-bit indicators, To DS 1112 and From DS 1114, are replaced by a 1-bit Direction indicator 1108. The Direction bit is used to indicate the direction of the frame on the "association" in the BSS, either from STA to AP or fro, AP to STA. In an MBSS, the STA that initiates the association may act as the AP. Between an AP STA and an Associated STA, the combination of the BSSID, AID, and Direction indicator can uniquely identify a pair of Destination STA and Source STA in an infrastructure BSS, in any deployment scenario, with or without overlapping BSSs. Therefore, the Class-3 MAC Data frame 1100 with the MAC header design of this embodiment may be properly received, decoded, and processed using a combination of the BSSID field 1102, the AID field 1104, and the Direction indicator 1108, instead of using a combination of three 6-byte address fields and two 1-bit indicators, thus resulting in a 10-byte MAC framing overhead reduction.

In addition, for an established association, the AID may be used to identify the MAC addresses of the associated STAs at both sides of the association. Therefore, when a transmitter address (TA) is needed for sending an acknowledgement for a received data frame, the Receiver of the data frame may identify the TA based on the AID in the data frame.

The AID as specified in the current IEEE 802.11 standard, 802.11-2012, is a unicast identifier which identifies an established association between two STAs, e.g., between an AP and a non-AP STA in an infrastructure BSS. The AID in the Class-3 MAC Data frame format may be used for unicast data frames without any changes to the definition of the AID concept.

Figure 12:
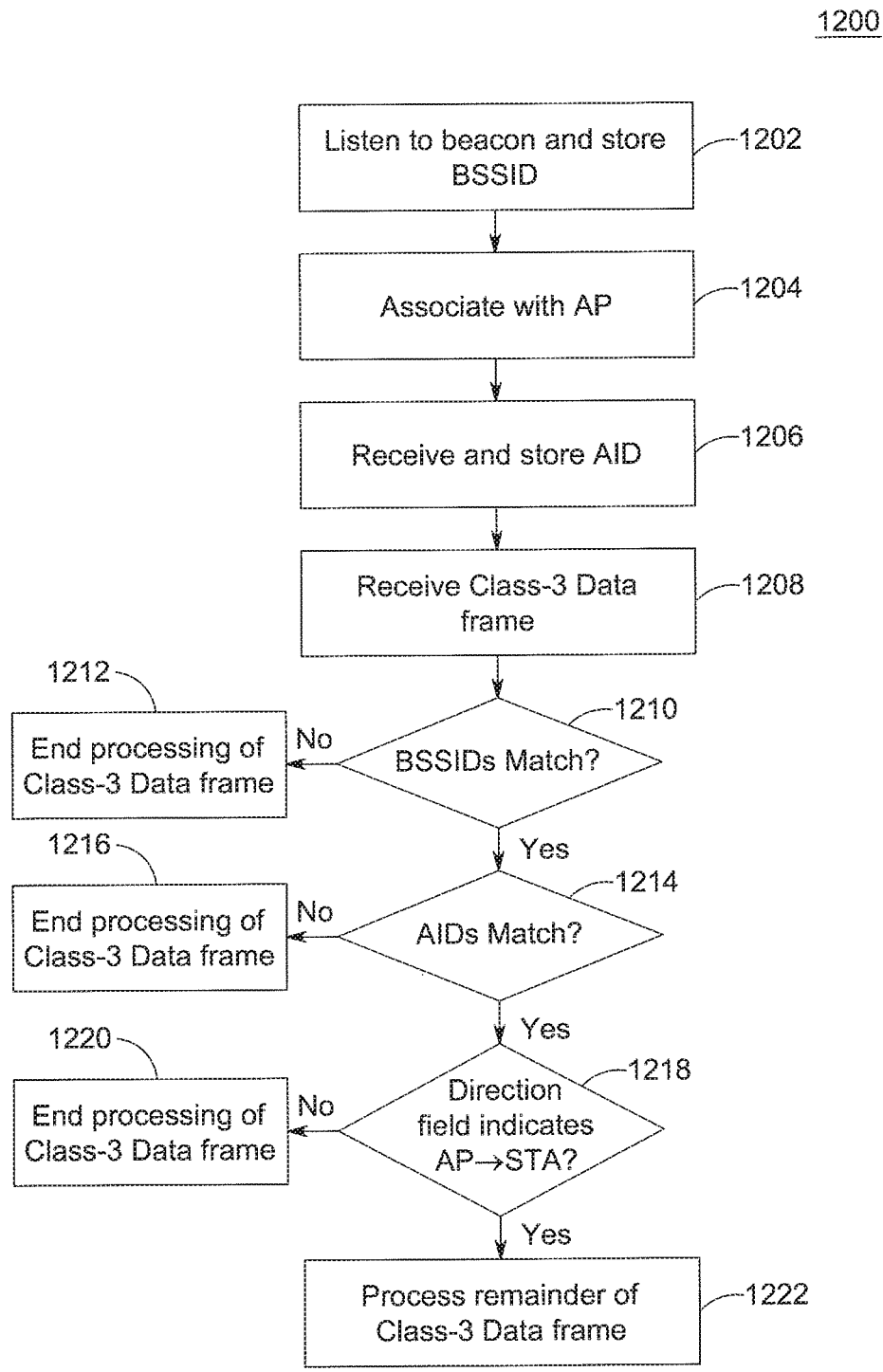
FIG. 12 shows a flow diagram for a possible Class-3 MAC Data frame processing procedure.

A general processing procedure 1200 for a STA that is capable of receiving the Class-3 MAC Data frame of this embodiment is shown in FIG. 12. The STA first listens to a beacon and stores the BSSID of the transmitting AP in a memory component (step 1202). The STA then associates with the AP (step 1204), and receives an assigned AID (step 1206). The STA may store the AID in a memory component. The STA then receives a Class-3 MAC Data frame with the inventive MAC header (step 1208). The STA compares the BSSID of the Class-3 MAC Data frame to the BSSID it received upon association (step 1210). If the BSSIDs do not match, the STA has determined that it was not the intended recipient of the Class-3 MAC Data frame, and may end the processing of the frame (step 1212). If the BSSIDs match, then the STA may compare the AID of the Class-3 MAC Data frame to the AID that it received upon association (step 1214). If the AIDs do not match, the STA has determined that it was not the intended recipient of the Class-3 MAC Data frame, and may end the processing of the frame (step 1216). If the AIDs match, the STA may inspect the Direction indicator to determine whether the Class-3 MAC Data frame has been sent from the AP to the STA (step 1218). If the Direction indicator indicates that the Class-3 MAC Data frame has been sent from the STA to the AP, the STA may end the processing of the data frame (step 1220). If the Direction field indicates that the Class-3 MAC Data frame was sent from the AP to the STA, the STA may process the remaining contents of the data frame (step 1222). If the STA wishes to send an Acknowledgment of the Class-3 MAC Data frame, the STA may use the BSSID of the received Class-3 MAC Data frame as the Acknowledgement frame's Receiving STA Address.

A general processing procedure is now described for an AP to receive and decode the Class-3 MAC Data frame of this embodiment. At association establishment, when the AP assigns an AID to a STA, the AP may also record the AID and other information about STA in a memory component, e.g., the STA's MAC address, capabilities, QoS requirements, etc. When the AP receives a Class-3 MAC Data frame with the inventive MAC header, the AP may compare the BSSID of the Class-3 MAC Data frame to its own BSSID. If the BSSIDs do not match, the AP has determined that it was not the intended recipient of the Class-3 MAC Data frame, and may end the processing of the frame. If the BSSIDs match, then the AP may check the AID of the Class-3 MAC Data frame among the AIDs that it has assigned and recorded. If the AID is not in the stored AID list, the AP has determined that it was not the intended recipient of the Class-3 MAC Data frame, and may end the processing of the frame. If the AID is in the AP's stored AID list, the AP may inspect the Direction indicator to determine whether the Class-3 MAC Data frame has been sent from the STA that has the AID. If the Direction indicator indicates that the Class-3 MAC Data frame has been sent from an AP, the AP may end the processing of the data frame. If the Direction bit indicates that the Class-3 MAC Data frame was sent from the STA, the AP may process the remaining contents of the data frame. If the AP wishes to send an Acknowledgment of the Class-3 MAC Data frame to the STA, the AP may use the AID of the received Class-3 MAC Data frame to retrieve the STA's address information, which it may use as the Receiving STA Address in the Acknowledgement frame.

The apparatus shown in FIGS. 1B and 1C may be configured to process the Class-3 MAC Data frame as described above and shown in FIG. 12. Specifically, the APs 170a, 170b may include a processor, a receiver, a transmitter, and a memory component configured to perform the methods described above. The STA 102 in FIG. 1C may also include a processor, a receiver, a transmitter, and a memory component configured to perform the methods described herein. The steps described herein are provided as an example. It is not required that all of the steps listed be performed, nor that they be performed in the order given.

The process described above allows a STA in an infrastructure BSS to receive and process a Class-3 MAC Data frame using only the BSSID, AID, and Direction fields. The Class-3 MAC Data frame design eliminates three address fields, resulting in a 10-byte MAC framing overhead reduction. This reduction may particularly benefit applications that typically have many small data packets, as described in more detail below, and may also be applied to broadcast and multi-cast Class-3 MAC Data frames.

With the introduction of the inventive Class-3 MAC Data frame, broadcast or multicast (group cast) Class-3 MAC Data frames may continue to be transmitted in the current three-address or four-address Class-3 MAC Data frame format, or they may be transmitted in the Class-3 MAC Data frame format shown in FIG. 11, with the following supporting mechanisms regarding the AID's definition and processing. First, the definition of the AID may be changed to allow multicast AIDs and broadcast AIDs in addition to unicast AIDs, where a multicast AID represents a group of associated STAs within a BSS, and a broadcast AID is a reserved AID code representing all of the associated STAs within the BSS.

As a second supporting mechanism, the MAC signaling and procedures for forming a STA group, and for adding a STA to or removing a STA from a STA group, may be defined. For example, the multicast AIDs may be valid in the domain of a BSS. In an infrastructure BSS, the AP may manage the AID assignments, including multicast AIDs. The AP may form a STA Group by itself or upon request by a non-AP STA or STAs. A STA Group may be uniquely identified by a multicast AID within the BSS. A non-AP STA may become a member of a STA group when the AP assigns to the STA the multicast AID of the Group. Such a multicast AID assignment may be done by the AP in an unsolicited manner or upon request by the STA. An AP may assign a multicast AID to a STA either at the association establishment, e.g., using an Association Response frame, or any time after the STA has associated with the AP, e.g., using a MAC management frame.

At the time a multicast AID is assigned to an associated STA, Group information may also be communicated to and stored at the STA, for example, the information communicated in the address fields of the current three-address or four-address MAC frames. In this way, such information may be retrieved by the STA when needed using the multicast AID presented in a received multicast frame. An associated STA may be a member of zero, one, or multiple STA groups, and thus, the AP may assign it with zero, one or multiple multicast AIDs. The AP may also remove a STA from a STA Group either by the AP's decision or upon receiving a request from the STA. Such a removal of a STA from a Group may be signaled by a MAC management message indicating the multicast AID of the Group, the action (i.e., removal), and any other necessary information. Additionally, the info that a multicast AID may represent may be defined, for example, mapping the AID to the current three-address or four-address MAC frame.

Figure 13:
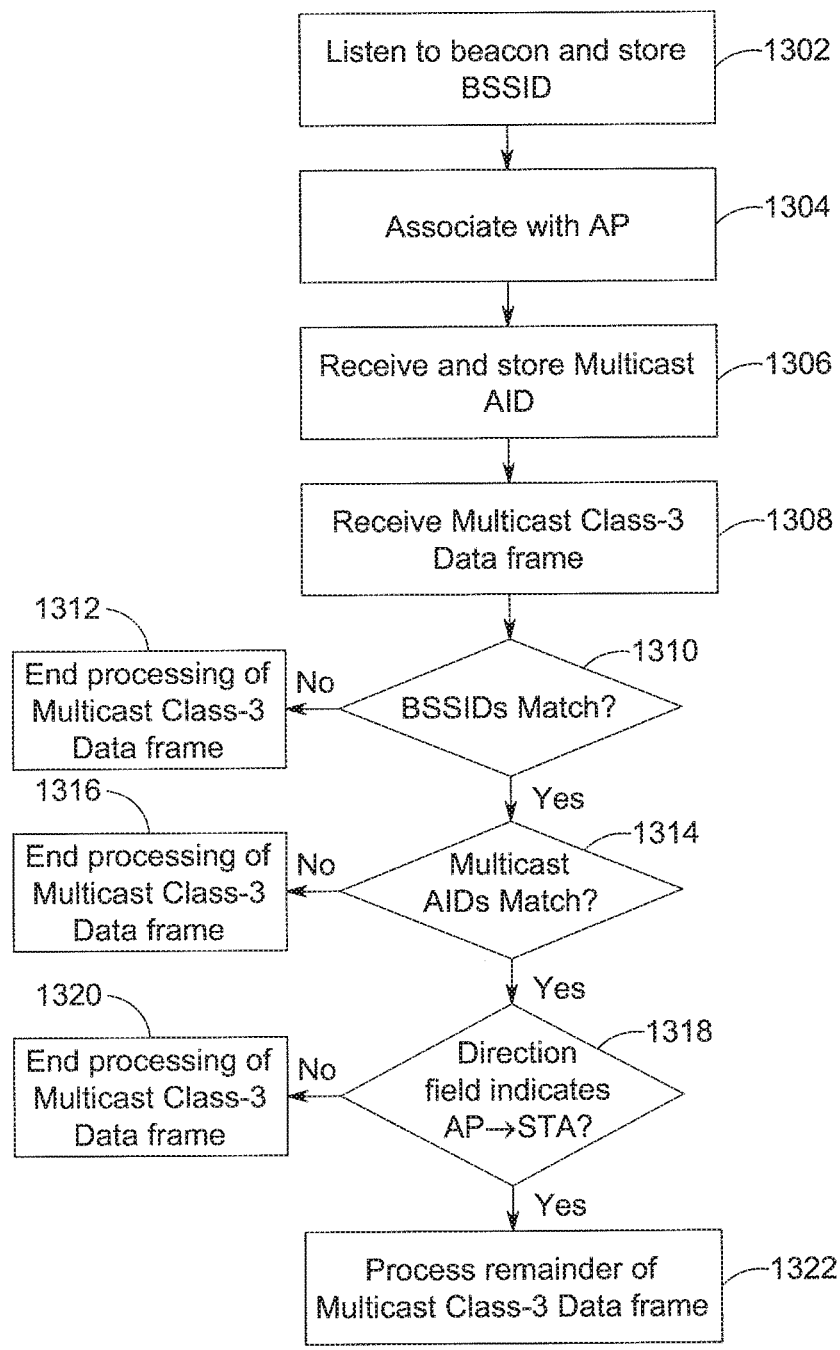
FIG. 13 shows a flow diagram for a possible Multicast Class-3 MAC Data frame processing procedure.

As an additional supporting mechanism, a procedure such as that shown in FIG. 13 may be defined for a STA to receive and process a multicast Class-3 MAC Data frame with a multicast AID. The procedure 1300 may begin with the STA listening to a beacon and storing the BSSID of the transmitting AP in a memory component (step 1302). The STA may then associate with the AP (step 1304). The STA may receive an assigned multicast AID (step 1306), as well as information about the multicast group, and may store the multicast AID and group information in a memory component. The STA may receive a multicast Class-3 MAC Data frame with the inventive MAC header (step 1308). The STA may compare the BSSID of the multicast Class-3 MAC Data frame to the BSSID it received upon association (step 1310). If the BSSIDs do not match, the STA has determined that it was not an intended recipient of the multicast Class-3 MAC Data frame, and may end the processing of the frame (step 1312). If the BSSIDs match, then the STA may compare the multicast AID of the Class-3 MAC Data frame to the multicast AID that it received from the AP (step 1314). If the multicast AIDs do not match, the STA has determined that it was not an intended recipient of the multicast Class-3 MAC Data frame, and may end the processing of the frame (step 1316). If the multicast AIDs match, the STA may inspect the Direction indicator to determine whether the multicast Class-3 MAC Data frame has been sent from the AP to the STA (step 1318). If the Direction indicator indicates that the multicast Class-3 MAC Data frame has been sent from the STA to the AP, the STA may end the processing of the data frame (step 1320). If the Direction field indicates that the multicast Class-3 MAC Data frame was sent from the AP to the STA, the STA may process the remaining contents of the data frame (step 1322). When processing the received multicast data frame, the STA may also use the multicast AID to retrieve the information about the multicast group that was communicated and stored at the time the multicast AID was assigned. If the STA wishes to send an Acknowledgment of the multicast Class-3 MAC Data frame, the STA may use the BSSID of the received data frame as the Acknowledgement frame's Receiving STA Address. The apparatus shown in FIGS. 1B and 1C may be configured to process the multicast Class-3 MAC Data frame as described above and shown in FIG. 13.

The MAC framing overhead reduction introduced by the Class-3 MAC Data frame format of this embodiment may be particularly useful to applications that typically have many small data packets, e.g., Machine-to-Machine (M2M) applications with meters/sensors, where a typical data packet size is around tens of bytes. In order to use an IEEE 802.11-based WLAN as the access technology in M2M communication systems, it may be important to reduce the MAC framing overhead, particularly in WLAN systems with small channel bandwidth, e.g., in IEEE 802.11ah-based WLAN systems.

In addition to the MAC framing overhead reductions introduced by the Class-3 MAC Data frame format shown in FIG. 11, a further overhead reduction may be achieved for the small-size data frame by the following changes. First, the 2-byte Sequence Control (SC) 1106 in FIG. 11 may be changed to a 1-byte SC that contains an 8-bit sequence number, under the consideration that no fragmentation is needed for a small-size data frame. Second, the "More Fragment" bit 1118 in the FS-FC field 1110 may be changed to "reserved."

Figure 14:
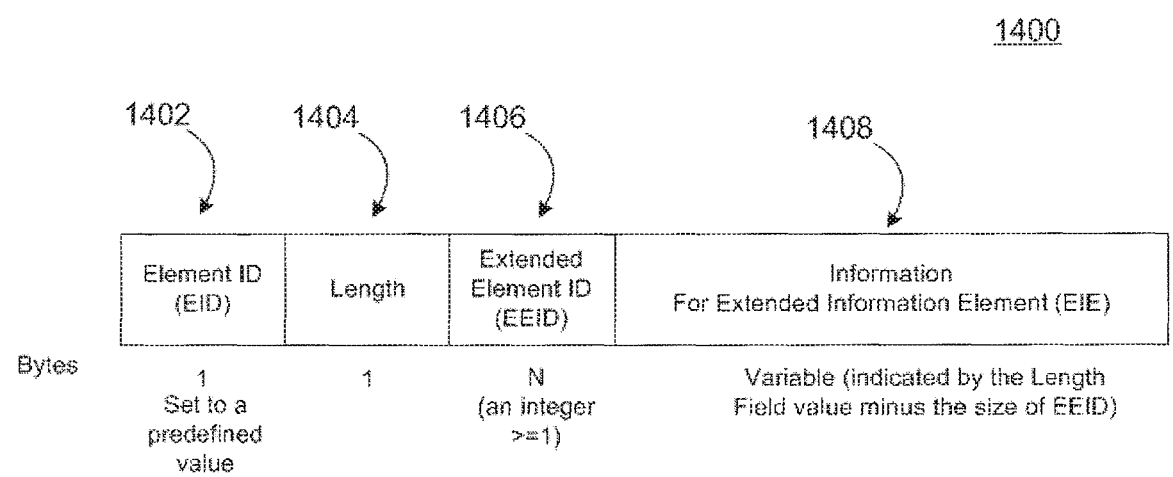
FIG. 14 shown an example Extended Information Element (EIE) format.

In order to resolve the Information Element (IE) extensibility issue described above, a multi-level extension scheme may use a similar basic idea as the multi-level MAC frame extension, i.e., introducing another level of identifier inside the current IE format for certain pre-determined EIDs. FIG. 14 illustrates an example of the Extended Information Element (EIE) 1400. Referring to FIG. 14, a currently available EID code point may be reserved for the Extended Information Element (EIE). This value in the EID field 1402 may indicate the presence of another ID field, i.e., an Extended Element Identifier (EEID) field 1406. The EEID field 1406 may be introduced after the Length field 1404 to identify Extended Information Elements (EIEs). The number of allowed EIEs may depend on the size of the EEID field 1406, for example, 256 EIEs may be identified using an 8-bit EEID field. When using a 16-bit EEID field, a total of 65,536 EIEs may be identified. Note that the Information body field 1408 for the EIE may be equal to the value in the Length field 1404 minus the size of EEID field 1406.

The EIE format may be further extended. For example, an EEID may be reserved to introduce another level of extension by using a third Identifier field in the EIE information body called, for example, an Extended-2 EID (E2EID). Therefore, an Extended-2 Information Element (E2IE) may be identified by a triplet, (EID, EEID, E2EID). This step may be applied again, as many times as needed, each time introducing another level of Extended Information Elements.

Another alternative method to further extend the EIE format is to reserve multiple EID code points for the purpose of IE extension. For example, if N EID code points are reserved to be used in the EID field 1402 in FIG. 14, for an 8-bit EEID field 1406, a total number of N times 256 (N*256) EIEs may be defined.

The above described Information Element (IE) extension mechanisms provide flexible extensibility for the IE format design while also allowing legacy STAs to properly identify and bypass the EIEs. The term "legacy STAs" here refers to the STAs that are compliant with the WLAN specification before the EIEs are introduced. When a STA receives a MAC management frame with an EIE, it may use the EID field value to identify whether the IE is known or unknown. If the value is unknown, as may be the case for a legacy STA, it may use the Length field value to properly bypass the IE. If the value is known, the STA may use the EEID field to identify and process the EID.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in station (STA), comprising:
   authenticating and associating with an Access Point (AP);
   receiving a medium access control (MAC) frame which includes a frame control field,
   wherein the frame control field of the MAC frame includes a first subfield indicating a type of the MAC frame, and a second subfield indicating a subtype of the MAC frame,
   wherein for the type of the MAC frame, a value of the second subfield indicates whether or not a third subfield is present in the MAC frame,
   wherein for the type of the MAC frame, the value of the second subfield has a first value that indicates that the third subfield is present in the MAC frame; and processing the third subfield, based on the first subfield and the second subfield.

2. The method of claim 1, wherein the first subfield comprises a Type subfield.

3. The method of claim 1, wherein the second subfield comprises a SubType subfield.

4. The method of claim 1, wherein the third subfield comprises an Extension-2 subfield.

5. The method of claim 1, wherein the MAC frame comprises a control frame.

6. The method of claim 1, further comprising:
decoding the third subfield, based on the first subfield and the second subfield, to determine the type of the subtype.

7. The method of claim 1, wherein for the type of the MAC frame, a first value of the second subfield indicates that the third subfield is present in a frame control field of the MAC frame.

8. A station (STA), comprising:
a processor comprising circuitry configured to authenticate and associate the STA with an Access Point (AP); and
a receiver comprising circuitry configured to receive a medium access control (MAC) frame which includes a frame control field,
wherein the frame control field of the MAC frame includes a first subfield indicating a type of the MAC frame, and a second subfield indicating a subtype of the MAC frame,
wherein for the type of the MAC frame, a value of the second subfield indicates whether or not a third subfield is present in the MAC frame,
wherein for the type of the MAC frame, a first value of the second subfield indicates that the third subfield is present in the frame control field of the MAC frame; and
wherein the processor further comprises circuitry configured to process the third subfield, based on the first subfield and the second subfield.

9. The STA of claim 8, wherein first subfield comprises a Type subfield.

10. The STA of claim 8, wherein the second subfield comprises a SubType subfield.

11. The STA of claim 8, wherein the third subfield comprises an Extension-2 subfield.

12. The STA of claim 8, wherein the MAC frame comprises a control frame.

13. The STA of claim 8, wherein the processor further comprises circuitry configured to decode the third subfield, based on the first subfield and the second subfield, to determine the type of the subtype.

14. The STA of claim 8, wherein for the type of the MAC frame, a first value of the second subfield indicates that the third subfield is present in the frame control field of the MAC frame.

15. An Access Point (AP), comprising:
a processor comprising circuitry configured to authenticate and associate the AP with a station (STA); and
a transmitter comprising circuitry configured to transmit a medium access control (MAC) frame which includes a frame control field,
wherein the frame control field of the MAC frame includes a first subfield indicating a type of the MAC frame, and a second subfield indicating a subtype of the MAC frame,
wherein for the type of the MAC frame, a value of the second subfield indicates whether or not a third subfield is present in the MAC frame,
wherein for the type of the MAC frame, a first value of the second subfield indicates that the third subfield is present in the frame control field of the MAC frame; and
the third subfield is decodable based on the first subfield and the second subfield.

16. The AP of claim 15, wherein first subfield comprises a Type subfield.

17. The AP of claim 15, wherein the second subfield comprises a SubType subfield.

18. The AP of claim 15, wherein the third subfield comprises an Extension-2 subfield.

19. The AP of claim 15, wherein the MAC frame comprises a control frame.

20. The AP of claim 15, wherein the third subfield is decodable based on the first subfield and the second subfield to determine the type of the subtype.

* * * * *